US008169525B2

(12) United States Patent
Ryoki et al.

(10) Patent No.: US 8,169,525 B2
(45) Date of Patent: May 1, 2012

(54) IMAGE SENSING DEVICE AND IMAGE SENSING SYSTEM

(75) Inventors: Tatsuya Ryoki, Kawasaki (JP); Toru Koizumi, Yokohama (JP); Masanori Ogura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 392 days.

(21) Appl. No.: 12/543,709

(22) Filed: Aug. 19, 2009

(65) Prior Publication Data

US 2010/0066881 A1    Mar. 18, 2010

(30) Foreign Application Priority Data

Sep. 12, 2008    (JP) ................................. 2008-235590

(51) Int. Cl.
*H04N 5/335*    (2011.01)
(52) U.S. Cl. ........................................ 348/308; 348/300
(58) Field of Classification Search .................. 348/308, 348/300–304; 257/291, 292; 250/208.1
See application file for complete search history.

(56) References Cited

U.S. PATENT DOCUMENTS

| | | | |
|---|---|---|---|
| 6,670,990 B1 | 12/2003 | Kochi et al. | 348/310 |
| 6,798,453 B1 | 9/2004 | Kaifu | 348/304 |
| 6,960,751 B2 | 11/2005 | Hiyama et al. | 250/208.1 |
| 7,110,030 B1 | 9/2006 | Kochi et al. | 348/308 |
| 7,227,208 B2 | 6/2007 | Ogura et al. | 257/292 |
| 7,321,110 B2 | 1/2008 | Okita et al. | 250/208.1 |
| 7,324,144 B1 | 1/2008 | Koizumi | 348/294 |
| 7,429,764 B2 | 9/2008 | Koizumi et al. | 257/292 |
| 7,466,003 B2 | 12/2008 | Ueno et al. | 257/462 |
| 7,538,810 B2 | 5/2009 | Koizumi et al. | 348/308 |
| 7,554,591 B2 | 6/2009 | Kikuchi et al. | 348/308 |
| 2006/0043440 A1 | 3/2006 | Hiyama et al. | 257/291 |
| 2006/0157759 A1 | 7/2006 | Okita et al. | 257/292 |
| 2006/0197857 A1* | 9/2006 | Barna et al. | 348/308 |
| 2007/0052831 A1 | 3/2007 | Ogura et al. | 348/308 |
| 2008/0024630 A1 | 1/2008 | Hiyama et al. | 348/241 |
| 2008/0036891 A1 | 2/2008 | Ono et al. | 348/308 |
| 2008/0062294 A1 | 3/2008 | Koizumi et al. | 348/300 |
| 2008/0062295 A1 | 3/2008 | Fujimura et al. | 348/301 |
| 2008/0062296 A1 | 3/2008 | Ogura et al. | 348/308 |
| 2009/0073298 A1 | 3/2009 | Ogura et al. | 348/308 |
| 2009/0153717 A1* | 6/2009 | Rossi | 348/308 |
| 2009/0159783 A1 | 6/2009 | Koizumi et al. | 250/208.1 |
| 2009/0207293 A1 | 8/2009 | Ryoki et al. | 348/308 |
| 2009/0219429 A1 | 9/2009 | Ogura et al. | 348/308 |

FOREIGN PATENT DOCUMENTS

| | | |
|---|---|---|
| JP | 11-150255 A | 6/1999 |
| JP | 2001-045378 A | 2/2001 |

* cited by examiner

*Primary Examiner* — Tuan Ho
(74) *Attorney, Agent, or Firm* — Fitzpatrick, Cella, Harper & Scinto

(57) ABSTRACT

An image sensing device comprises a readout unit, an output amplifier, and a horizontal scanning unit, wherein the horizontal scanning unit scans a plurality of column signal holding circuits in a plurality of holding blocks in the readout unit in a direction along a row, in each holding block, a first operation in which the signal held in a first holding unit is transferred to a second holding unit via a transfer switch is performed, and subsequently, a second operation in which the signal held in the second holding unit is transferred to the output amplifier, and a third operation in which a signal output from a pixel is read out to the first holding unit are performed in parallel, and the second operation and the first operation are performed in parallel between different holding blocks in the plurality of holding blocks.

6 Claims, 16 Drawing Sheets

IMAGE SENSING DEVICE AND IMAGE SENSING SYSTEM

BACKGROUND OF THE INVENTION

1. Field of the Invention

The present invention relates to an image sensing device and an image sensing system.

2. Description of the Related Art

In Japanese Patent Laid-Open No. 2001-45378, it is disclosed that in an solid-state image sensing device, a row selection line connected to the pixels of each row in a pixel array in which a plurality of pixels a11 to b23 are arrayed in a direction along a row and in a direction along a column is scanned by a vertical shift register VSR (see FIG. 1 of Japanese Patent Laid-Open No. 2001-45378). In this solid-state image sensing device, a vertical signal line that is connected to the pixels of a column in the pixel array is connected to a storage unit 1 at one end and a storage unit 2 at the other end. The vertical shift register VSR transfers the signals of the pixels (a11 to a13) of an odd row in the pixel array to the storage unit 1, as shown in FIG. 2 of Japanese Patent Laid-Open No. 2001-45378. Then, the signals of the pixels (b11 to b13) of an even row in the pixel array are transferred to the storage unit 2 by the vertical shift register VSR, and, in parallel with this operation, a horizontal shift register HSR1 causes the signals of the pixels a11 to a13 to be output sequentially from the storage unit 1 as OUT1. After a prescribed period has elapsed after the horizontal shift register HSR1 started this operation, a horizontal shift register HSR2 causes the signals of the pixels b11 to b13 to be output sequentially from the storage unit 2 as OUT2, in parallel with the operation of the horizontal shift register HSR1. Thus, according to Japanese Patent Laid-Open No. 2001-45378, it is held that because two rows of signals can be independently transferred to two storage units during a given horizontal scanning period, a long post-transfer readout period can be secured, and the readout operation frequency can be kept low.

With Japanese Patent Laid-Open No. 11-150255, a capacitance C, an amplifier 2, a switch SW, a capacitance Csh and an amplifier are connected in this order to a signal wiring SIG that is connected to the pixels in each column of a pixel array, in a photoelectric conversion device (see FIG. 2 of Japanese Patent Laid-Open No. 11-150255). Also, with this photoelectric conversion device, a thin film transistor T is turned on and the signals of photoelectric conversion pixels S are transferred to the capacitance C and stored in the capacitance C, after the capacitance C has been reset by a reset switch 1 in response to a reset signal rc, as shown in FIG. 3 of Japanese Patent Laid-Open No. 11-150255. Then, when the switch SW is turned on by a Smpl pulse, the signals stored in the capacitance C are amplified by the amplifier 2 and transferred to the capacitance Csh in a sample hold circuit 3, and stored in the capacitance Csh. After the switch SW has been turned off, the signals stored in the capacitance Csh are transferred via the amplifier to an A/D converter 7 and A/D converted by the A/D converter 7, before being output to Dout, when an analog multiplexer 4 selects a terminal 4 according to ad0 to ad8 pulses. With this configuration, it is held, according to Japanese Patent Laid-Open No. 11-150255, that the SN ratio can be readily improved, because the signals stored in the capacitance Csh are not affected by the fluctuation in the analog voltage output by the amplifier 2 in a state where the switch SW is turned off.

With the solid-state image sensing device shown in Japanese Patent Laid-Open No. 2001-45378, a horizontal blanking period for at least one row is provided with respect to horizontal transferring operation of the signals of two rows of pixels, as shown in FIG. 2 of Japanese Patent Laid-Open No. 2001-45378. Specifically, a period (transfer a) for transferring the signals of the pixels (a11 to a13) of an odd row to the storage unit 1 is a horizontal blanking period in which neither the horizontal transferring operation of the signals of the pixels (a11 to a13) of the odd row nor the horizontal transferring operation of the signals of the pixels (b11 to b13) of the even row is performed.

Also, with the solid-state image sensing device shown in Japanese Patent Laid-Open No. 2001-45378, the signals of the pixels (a11 to a13) of the odd row are transferred to a differential amplifier D1, and output from the differential amplifier D1 as OUT1. On the other hand, the signals of the pixels (b11 to b13) of the even row are transferred to another differential amplifier, and output from the other differential amplifier as OUT2. From the perspective of the other differential amplifier, the period (transfer b) for transferring the signals of the pixels (b11 to b13) of the even row to the storage unit 2 is a horizontal blanking period in which the horizontal transferring operation of signals is not performed, as shown in FIG. 2 of Japanese Patent Laid-Open No. 2001-45378. Also, as is clear from FIG. 2 of Japanese Patent Laid-Open No. 2001-45378, a horizontal blanking period exists between consecutive horizontal transferring periods for each of the channels.

With the photoelectric conversion device shown in Japanese Patent Laid-Open No. 11-150255, a horizontal blanking period for one row is provided with respect to horizontal transferring operation of the signals of one row of pixels, as shown in FIG. 3 of Japanese Patent Laid-Open No. 11-150255. Specifically, a Ttft period and the following period during which the pulse Smpl is high are provided as a period in which the terminal selection operation by the analog multiprocessor 4 is not performed, that is, a horizontal blanking period.

In the case where a horizontal blanking period for one row is provided every two rows or every one row, the horizontal blanking period in the total readout period from the pixel array to the output amplifier becomes longer when the number of rows in the pixel array increases due to an increase in the number of pixels in the pixel array. As a result, reducing the total readout period becomes difficult.

SUMMARY OF THE INVENTION

The present invention provides for reducing the length of a horizontal blanking period in a total readout period from a pixel array to an output amplifier.

An image sensing device according to a first aspect of the present invention comprises: a pixel array in which a plurality of pixels are arrayed in a direction along a row and in a direction along a column; a row selection unit that selects a row in the pixel array; a readout unit that reads out and temporarily holds a signal from the row selected by the row selection unit; an output amplifier; and a horizontal scanning unit that scans the readout unit in a direction along a row, wherein the readout unit includes a plurality of holding blocks, each of the plurality of holding blocks includes at least one column signal holding circuit that temporarily holds a signal of one column of the row selected by the row selection unit, the column signal holding circuit includes: a first holding unit that holds a signal output from a pixel; a second holding unit; and a transfer switch that transfers the signal held in the first holding unit to the second holding unit, the horizontal scanning unit scans the plurality of column signal holding circuits in the readout unit in a direction along a row, such that the signals of the columns held in the second holding units of the column signal holding circuits are sequentially transferred to the output amplifier, in each of the plurality of holding blocks, a first operation in which the signal held in the first holding unit of the column signal holding circuit is transferred to the second holding unit via the transfer switch is performed, and subsequently, a second operation and a third operation are performed in parallel, wherein, in the second operation, the signal transferred to and held in the second holding unit of the column signal holding circuit is transferred to the output amplifier in response to scanning by the horizontal scanning unit, and, in the third operation, a signal output from a pixel in a row that is selected next by the row selection unit is read out to the first holding unit of the column signal holding circuit, the second operation and the first operation are performed in parallel between different holding blocks in the plurality of holding blocks.

An image sensing system according to a second aspect of the present invention is provided with an image sensing device according to the first aspect of the present invention, an optical system that forms an image on an image sensing plane of the image sensing device, and a signal processing unit that processes a signal output from the image sensing device and generates image data.

According to the present invention, the length of a horizontal blanking period in a total readout period from a pixel array to an output amplifier can be reduced.

Further features of the present invention will become apparent from the following description of exemplary embodiments with reference to the attached drawings.

DESCRIPTION OF THE EMBODIMENTS

Figure 1:
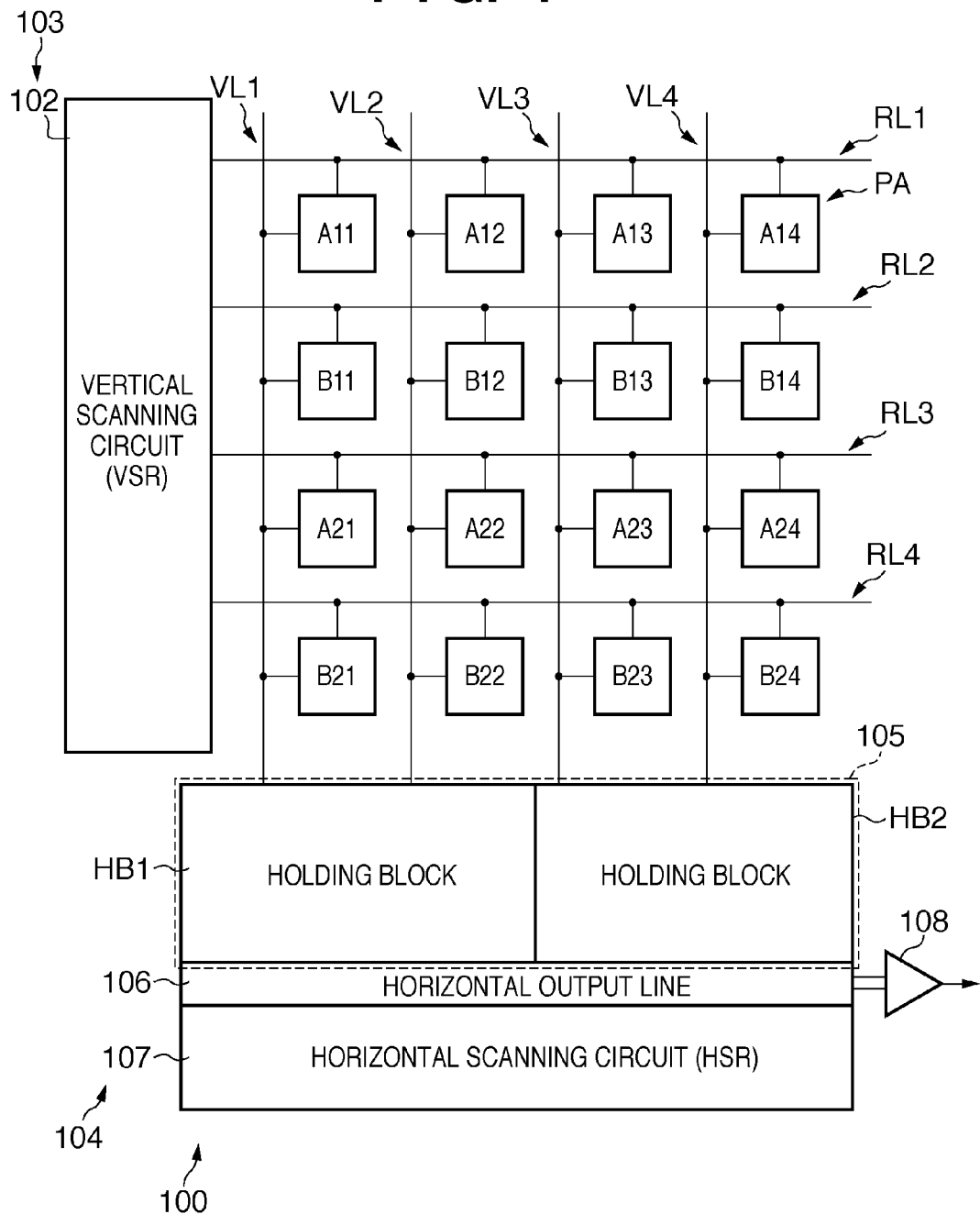
FIG. 1 shows a configuration of an image sensing device 100 according to a first embodiment of the present invention.

An image sensing device 100 according to a first embodiment of the present invention will be described using FIG. 1. FIG. 1 shows a configuration of the image sensing device 100 according to the first embodiment of the present invention.

The image sensing device 100 comprises a pixel array PA, a row selection unit 103, a readout unit 105, a horizontal scanning unit 104, and an output amplifier 108.

In the pixel array PA, a plurality of pixels A11 to B24 are arrayed in a direction along a row and in a direction along a column. In FIG. 1, a case where the pixel array is configured by four rows and four columns of pixels is shown, in order to simplify the description.

The row selection unit 103 selects rows in the pixel array PA. The row selection unit 103 includes a vertical scanning circuit (VSR) 102. The vertical scanning circuit 102 selects rows in the pixel array PA, by scanning the pixel array PA in a vertical direction (in a direction along a column) and supplying an active level selection control signal via row control lines RL1 to RL4 that are connected to the pixels of each row of the pixel array PA. Also, the vertical scanning circuit 102 supplies an active level transfer control signal to the pixels in the selected row, such that signals are output from the pixels in the selected row to vertical output lines VL1 to VL4. Here, the vertical output lines VL1 to VL4 are connected to the pixels of each column in the pixel array PA.

The readout unit 105 temporarily holds the signals output from the pixels of the row selected by the row selection unit 103 to the vertical output lines VL1 to VL4. The readout unit 105 includes a plurality of holding blocks HB1 and HB2. Each of the plurality of holding blocks HB1 and HB2 includes at least one column signal holding circuit that temporarily holds the signal of one column in the row selected by the row selection unit 103. In FIG. 1, two holding blocks are illustrated as a configuration for holding the signals output from a selected row. The holding blocks HB1 and HB2 each include two column signal holding circuits that correspond to two columns in the pixel array PA (FIG. 3).

Specifically, the holding block HB1 is connected to the pixels of the first column and the second column via the vertical output lines VL1 and VL2. The holding block HB1 includes a column signal holding circuit HC1 and a column signal holding circuit HC2 (see FIG. 3). The column signal holding circuit HC1 receives a signal output from the pixel (A11, B11, A21, B21) of the first column in the row selected by the row selection unit 103, via the vertical output line VL1. The column signal holding circuit HC2 receives a signal output from the pixel (A12, B12, A22, B22) of the second column in the row selected by the row selection unit 103, via the vertical output line VL2.

The holding block HB2 is connected to the pixels in the third column and the fourth column via the vertical output lines VL3 and VL4. The holding block HB2 includes a column signal holding circuit HC3 and a column signal holding circuit HC4 (see FIG. 3). The column signal holding circuit HC3 receives a signal output from the pixel (A13, B13, A23, B23) of the third column in the row selected by the row selection unit 103, via the vertical output line VL3. The column signal holding circuit HC4 receives a signal output from the pixel (A14, B14, A24, B24) of the fourth column in the row selected by the row selection unit 103, via the vertical output line VL4.

Figure 3:
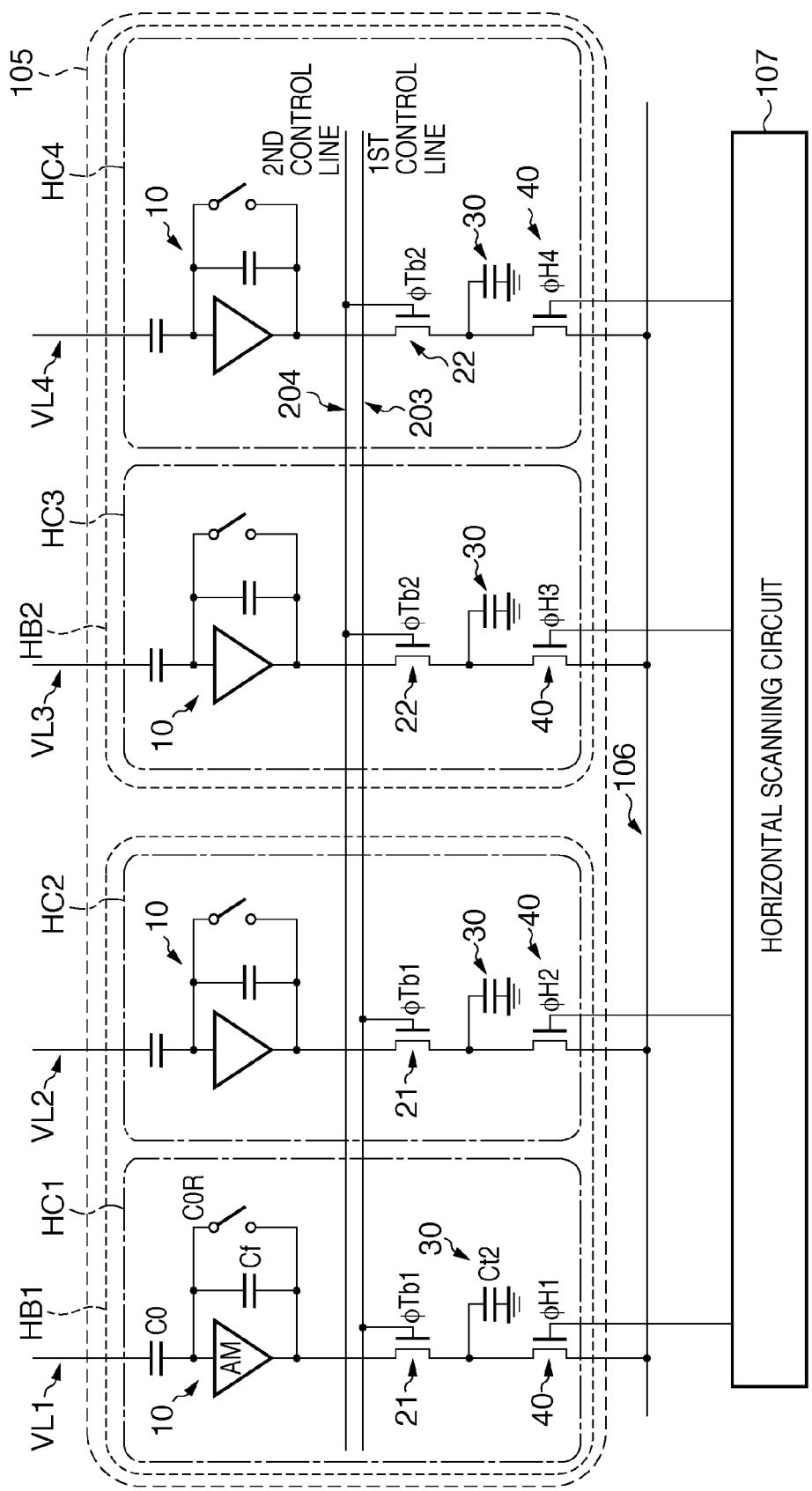
FIG. 3 shows a layout configuration of a plurality of holding blocks HB1 and HB2.

Note that while FIG. 3 shows an example where two holding blocks are each provided in correspondence with two columns of the pixel array, three or more holding blocks may be used as a configuration for holding signals output from a selected row.

The horizontal scanning unit 104 scans the readout unit 105 in a horizontal direction (in a direction along a row). That is, the horizontal scanning unit 104 scans the plurality of column signal holding circuits HC1 to HC4 in the readout unit 105 in a direction along a row, such that the signals of the columns held in second holding units (described below) of the column signal holding circuits are sequentially transferred to the output amplifier 108. In other words, the horizontal scanning unit 104 scans the signals of the columns held in the plurality of holding blocks HB1 and HB2, together with sequentially selecting the plurality of holding blocks HB1 and HB2. The horizontal scanning unit 104 thereby ensures that the signals of the columns (first to fourth columns) held in the plurality of holding blocks HB1 and HB2 are sequentially transferred to the output amplifier 108 via a horizontal output line 106. The horizontal scanning unit 104 includes a horizontal scanning circuit (HSR) 107. The horizontal scanning circuit 107 sequentially supplies active level horizontal transferring signals ($\phi$H1 to $\phi$H4) to the plurality of column signal holding circuits HC1 to HC4 in the plurality of holding blocks HB1 and HB2. In the case shown in FIG. 1, the horizontal scanning circuit 107 firstly horizontally scans the column signal holding circuits HC1 and HC2 included in the holding block HB1, and then horizontally scans the column signal holding circuits HC3 and HC4 included in the holding block HB2.

The output amplifier 108 generates an image signal based on the signals received via the horizontal output line 106, and outputs the generated image signal.

Figure 2:
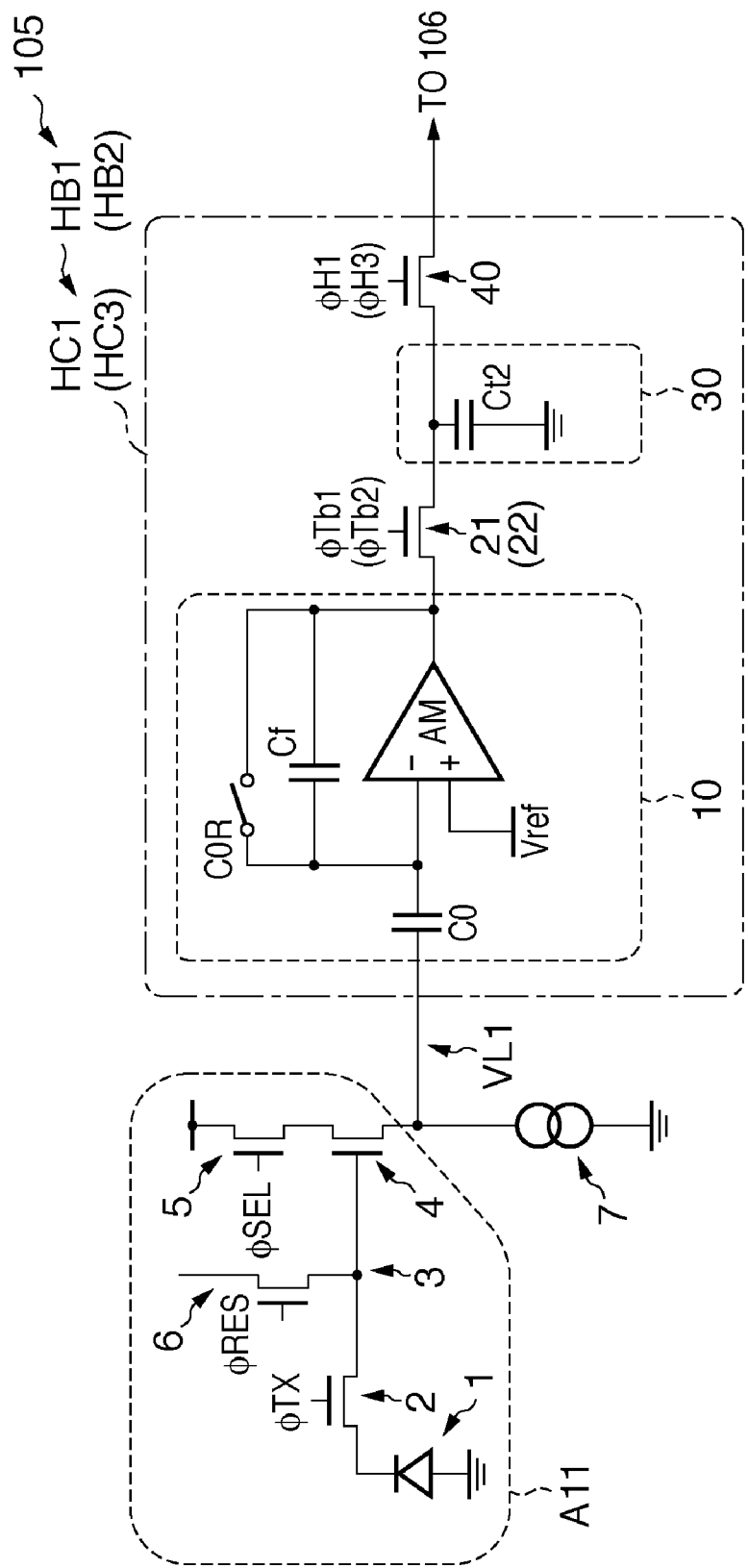
FIG. 2 is an equivalent circuit diagram that simplifies a configuration for one row from a pixel to a horizontal output line in the image sensing device 100 according to the first embodiment of the present invention.

The configuration of the pixels A11 to B24 in the pixel array PA will be described using FIG. 2. FIG. 2 is an equivalent circuit diagram that simplifies the configuration for one row from a pixel to a horizontal output line in the image sensing device 100 according to the first embodiment. Hereinafter, the configuration of the pixel A11 will be illustratively described, although the configuration of the other pixels is similar.

The pixel A11, as shown in FIG. 2, includes a photoelectric conversion unit 1, a transfer unit 2, a charge-voltage converter 3, a reset unit 6, an output unit 4, and a selection unit 5.

The photoelectric conversion unit 1 generates and stores charges according to light. The photoelectric conversion unit 1 is, for example, a photodiode.

The transfer unit 2 transfers the charges generated by the photoelectric conversion unit 1 to the charge-voltage converter 3. The transfer unit 2 is, for example, a transfer transistor, and transfers the charges generated by the photoelectric conversion unit 1 to the charge-voltage converter 3, by being turned on when an active level transfer control signal $\phi$TX is supplied from the vertical scanning circuit 102 to the gate.

The charge-voltage converter 3 converts the transferred charges to a voltage. The charge-voltage converter 3 is, for example, a floating diffusion.

The reset unit 6 resets the charge-voltage converter 3. The reset unit 6 is, for example, a reset transistor, and resets the charge-voltage converter 3, by being turned on when an active level reset control signal $\phi$RES is supplied from the vertical scanning circuit 102 to the gate.

The output unit 4 outputs a signal according to the voltage of the charge-voltage converter 3. The output unit 4 is, for example, an amplifying transistor, and outputs a signal according to the voltage of the charge-voltage converter 3 to the vertical output line VL1, by performing a source follower operation together with a constant current source 7 that is connected to the vertical output line VL1. The output unit 4 outputs a noise signal according to the voltage of the charge-voltage converter 3 to the vertical output line VL1, in a state where the charge-voltage converter 3 has been reset by the reset unit 6. The output unit 4 outputs an optical signal according to the voltage of the charge-voltage converter 3 to the vertical output line VL1, in a state where the charge generated by the photoelectric conversion unit 1 has been transferred to the charge-voltage converter 3 by the transfer unit 2.

The selection unit 5 sets the pixel A11 to a selected/deselected state. The selection unit 5 is, for example, a selection transistor, and sets the pixel A11 to the selected state, by being turned on when an active level selection control signal $\phi$SEL is supplied from the vertical scanning circuit 102 to the gate. The selection unit 5 sets the pixel A11 to the deselected state, by being turned off when a non-active level selection control signal $\phi$SEL is supplied from the vertical scanning circuit 102 to the gate.

As a result of this configuration, the pixels of the columns in the row selected by the row selection unit 103 output noise signals and optical signals to the vertical output lines at different timings.

The column signal holding circuits in the holding blocks will be described using FIG. 2. Hereinafter, the column signal holding circuit HC1 in the holding block HB1 will be mainly discussed. The configuration of the column signal holding circuit HC2 in the holding block HB1 is similar to the configuration of the column signal holding circuit HC1.

The column signal holding circuit HC1 in the holding block HB1 includes a first holding unit 10, a transfer switch 21, a second holding unit 30, and a switch 40.

The first holding unit 10 receives and holds the signals output from the pixel A11 via the vertical output line VL1. That is, to the first holding unit 10, a signal is read out from the pixel A11 via the vertical output line VL1. The first holding unit 10 includes a column amplifier AM, a clamp capacitance C0, a feedback capacitance Cf, and a switch C0R.

A terminal for supplying a reference potential Vref is connected to the non-inverting input terminal of the column amplifier AM. The vertical output line VL1 is connected to the inverting input terminal of the column amplifier AM via the clamp capacitance C0. Also, the feedback capacitance Cf and the switch C0R are connected in parallel to the output terminal and the inverting input terminal of the column amplifier AM.

When the switch C0R is turned on, a voltage between both ends of the feedback capacitance Cf is reset to Vref. Charges held in the feedback capacitance Cf is discharged to the power supply or GND, and the feedback capacitance Cf reverts to a reset state. Then, when the switch C0R is turned off after the noise signal has been output from the pixel to the vertical output line VL, the noise signal (VN) output from the pixel is input to the clamp capacitance C0 and held.

Then, when the transfer unit 2 in the pixel A11 is turned on, an optical signal (VS+VN) output from the pixel is input to the clamp capacitance C0 and held. At this time, the following signal appears in the output terminal of the column amplifier AM:

$$Vout = (VS+VN-VN)*(C0/Cf) + Vref + Voffset \quad (1)$$

Here, Voffset is the offset noise of the column amplifier AM. The following signal thereby appears in the feedback capacitance Cf as the image signal.

$$\begin{aligned} Vcf &= Vout - Vref \\ &= (VS+VN-VN)*(C0/Cf) + Voffset \\ &= VS*(C0/Cf) + Voffset \end{aligned} \quad (2)$$

As represented by expression (2), a signal obtained by applying the gain of C0/Cf to the optical signal and further adding the offset of the column amplifier AM is held. The optical signal VS is thus held in the feedback capacitance Cf of the first holding unit 10.

The transfer switch 21 transfers the signal held in the first holding unit 10 to the second holding unit 30, by being turned on when an active level control signal φTb1 is received from the vertical scanning circuit 102 via a first control line 203 (see FIG. 3).

The second holding unit 30 holds the signal transferred from the first holding unit 10 via the transfer switch 21.

The switch 40 transfers the signal held in the second holding unit 30 to the output amplifier 108 via the horizontal output line 106, by being turned on when an active level horizontal scanning control signal φH1 is received from the horizontal scanning circuit 107.

Note that the configuration of the column signal holding circuits HC3 and HC4 in the holding block HB2 is similar to a configuration in which the transfer switch 21 in the configuration of the column signal holding circuit HC1 in the holding block HB1 is replaced with a transfer switch 22. The transfer switch 22 transfers the signal held in the first holding unit 10 to the second holding unit 30, by being turned on when an active level control signal φTb2 is received from the vertical scanning circuit 102 via a second control line 204 (see FIG. 3).

The layout configuration of the plurality of holding blocks HB1 and HB2 will be described using FIG. 3. FIG. 3 shows an arrangement of circuit elements that corresponds to the layout configuration of the plurality of holding blocks HB1 and HB2, and represents a feature of the present invention.

The plurality of holding blocks HB1 and HB2 are arrayed in a direction along a row. The transfer switches 21 in the column signal holding circuits HC1 and HC2 of the holding block HB1 and the transfer switches 22 in the column signal holding circuits HC3 and HC4 of the holding block HB2 differ in the control lines connected to the gates. The gates of the transfer switches 21 is connected to the first control line 203, and receive the control signal φTb1 from the vertical scanning circuit 102 via the first control line 203. The gates of the transfer switches 22 is connected to the second control line 204, and receive the control signal φTb2 from the vertical scanning circuit 102 via the second control unit 204. As a result of this configuration, the on/off of the transfer switches 21 and the transfer switches 22 can be controlled independently. The transfer switches 21 and 22 are thereby turned on at different timings between different holding blocks in the plurality of holding blocks HB1 and HB2.

Figure 4:
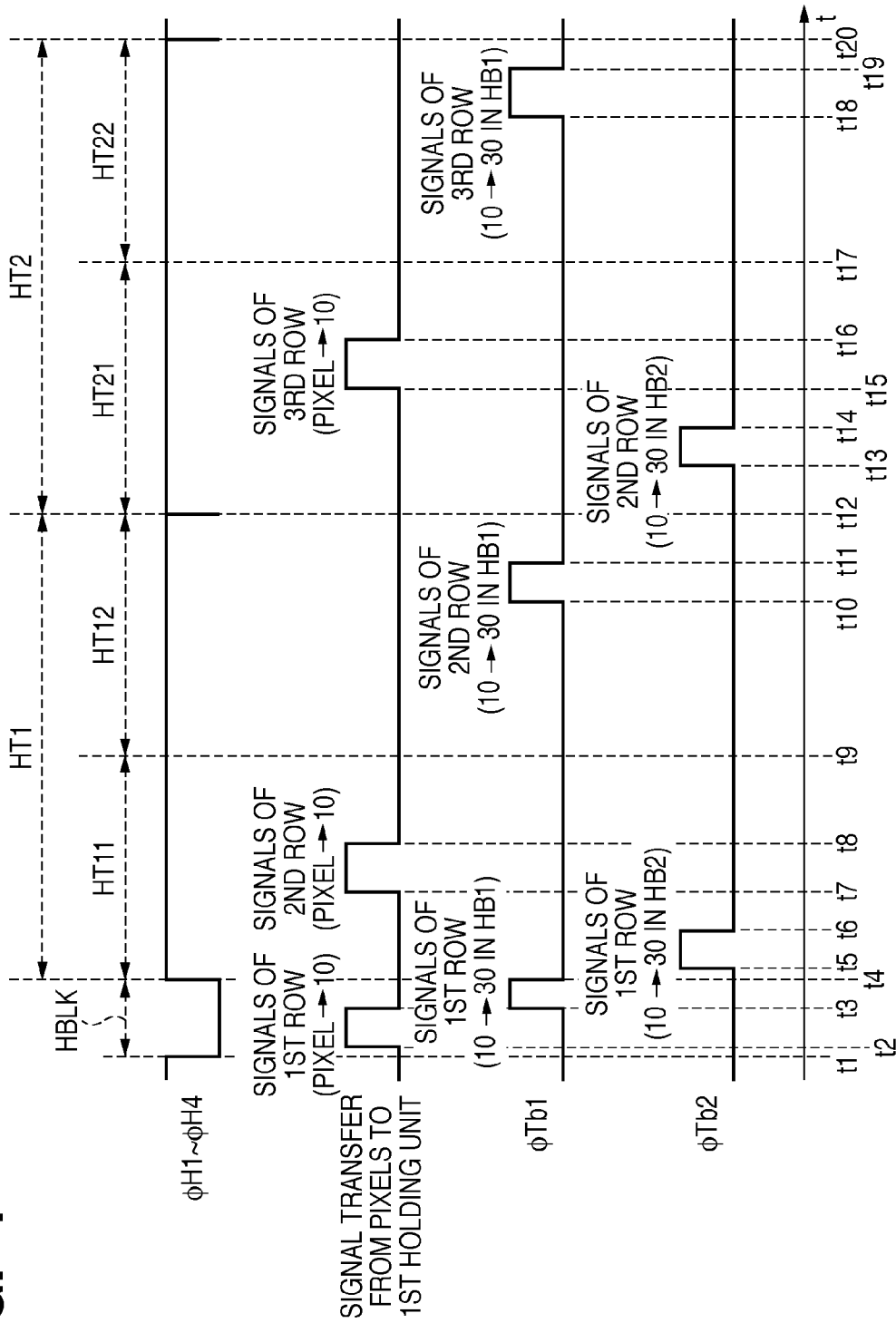
FIG. 4 is a timing chart showing an operation of the image sensing device 100 according to the first embodiment of the present invention.

The operation of the image sensing device 100 according to the first embodiment of the present invention will be described using FIG. 4. FIG. 4 is a timing chart showing the operation of the image sensing device 100 according to the first embodiment of the present invention.

Immediately prior to time t1, the vertical scanning circuit 102 supplies an active level reset control signal φRES to the reset units 6 of the pixels A11 to A14 of the first row, and resets the charge-voltage converters 3 of the pixels A11 to A14 of the first row.

The period from times t1 to t4 is a horizontal blanking period HBLK.

In the period from times t1 to t2 during the horizontal blanking period HBLK, the vertical scanning circuit 102 supplies an active level selection control signal φSEL to the selection units 5 of the pixels A11 to A14 of the first row, and selects the pixels A11 to A14 of the first row. The noise signals output from the pixels A11 to A14 of the first row to the vertical output lines VL1 to VL4 are thereby transferred to the first holding units 10 of the holding blocks HB1 and HB2, and held.

In the period from times t2 to t3 during the horizontal blanking period HBLK, the vertical scanning circuit 102 performs the following operation. That is, the vertical scanning circuit 102 performs an operation of causing the first holding units 10 of the holding blocks HB1 and HB2 to hold difference signals of the noise signals and the optical signals output at different timings from the pixels A11 to A14 of the first row to the vertical output lines VL1 to VL4. Because the aforementioned operation (operation of generating a difference signal of a noise signal and an optical signal) is performed by the first holding unit 10 in this period, the signal held in the first holding unit 10 will be a signal in which the noise signal of the pixel has been removed.

In the period from times t3 to t4 during the horizontal blanking period HBLK, the vertical scanning circuit 102 supplies an active level control signal φTb1 to the gates of the transfer switches 21 of the holding block HB1. A first operation is thereby performed in the holding block HB1. The first operation is an operation in which the signals held in the first holding units 10 of the column signal holding circuits HC1 and HC2 are transferred to the second holding units 30 via the transfer switches 21.

The period from times t4 to t12 is a horizontal transferring period HT1 for the signals of the pixels of the first row. The horizontal transferring period HT1 includes a first period HT11 and a second period HT12. The first period HT11 is a period in which a second operation is performed in the holding block (first holding block) HB1. The second operation is an operation in which the signals transferred to and held in the second holding units 30 of the column signal holding circuits HC1 and HC2 are transferred to the output amplifier 108 via the switches 40 and the horizontal output line 106, in response to scanning by the horizontal scanning unit 104. The second period HT12 follows the first period HT11, and is a period in which the second operation is performed in the holding block (second holding block) HB2.

Specifically, in the first period HT11, the horizontal transferring signals φH1 and φH2 are sequentially activated, and the signals held in the second holding units 30 of the column signal holding circuits HC1 and HC2 of the holding block HB1 are sequentially transferred to the output amplifier 108. In the second period HT12, the horizontal transferring signals φH3 and φH4 are sequentially activated, and the signals held in the second holding units 30 of the column signal holding circuits HC3 and HC4 of the holding block HB2 are sequentially transferred to the output amplifier 108.

Meanwhile, in the period from times t5 to t6 during the first period HT11, the vertical scanning circuit 102 supplies an active level control signal φTb2 to the gates of the transfer switches 22 of the holding block HB2. In the column signal holding circuits HC3 and HC4 of the holding block HB2, the first operation in which the signals held in the first holding unit 10 are transferred to the second holding unit 30 via the transfer switch 22 is thereby performed.

In the period from times t6 to t7 in the first period HT11, the vertical scanning circuit 102 supplies an active level reset control signal φRES to the reset units 6 of the pixels B11 to B14 of the second row, and resets the charge-voltage converters 3 of the pixels B11 to B14 of the second row.

After the resetting is complete, the vertical scanning circuit 102 supplies an active level selection control signal φSEL to the selection units 5 of the pixels B11 to B14 of the second row, and selects the pixels B11 to B14 of the second row. The noise signals output from the pixels B11 to B14 of the second row to the vertical output lines VL1 to VL4 are thereby transferred to the first holding unit 10 of the holding blocks HB1 and HB2, and held.

In the period from times t7 to t8 in the first period HT11, the vertical scanning circuit 102 supplies an active level transfer control signal φTX to the gates of the transfer units (transfer transistors) 2 in the pixels B11 to B14 of the second row. A third operation is thereby performed in the holding blocks HB1 and HB2. The third operation is an operation in which optical signals are read out from the pixels B11 to B14 of the second row to the first holding units 10 via the vertical output lines VL1 to VL4. The first holding units 10 of the holding blocks HB1 and HB2 generate difference signals of the optical signals and the noise signals, and hold the difference signals.

That is, in the period HT1 in which the second operations in the plurality of holding blocks are performed sequentially, the third operation is performed in the holding blocks, after the first operation in the plurality of holding blocks is complete.

In the period from times t10 to t11 during the second period HT12, the vertical scanning circuit 102 supplies an active level control signal φTb1 to the gates of the transfer switches 21 of the holding block HB1. In the column signal holding circuits HC1 and HC2 of the holding block HB1, the first operation in which the signals held in the first holding unit 10 are transferred to the second holding unit 30 via the transfer switch 21 is thereby performed.

Subsequently, when the horizontal transferring period HT1 for the signals of the pixels of the first row ends at time t12, the horizontal transferring period HT2 for the signals of the pixels of the second row starts. The horizontal transferring period HT2 includes a first period HT21 and a second period HT22, and is a period in which operations similar to the horizontal transferring period HT1 are performed.

Thus, the holding block (first holding block) HB1 performs the first operation (transfer operation in circuit) prior to the first period HT11, and the holding block (second holding block) HB2 performs the first operation in the first period HT11. Also, after the first operations of the plurality of holding blocks HB1 and HB2 in the first period HT11 are complete, the holding blocks HB1 and HB2 each perform the third operation. The holding block (first holding block) HB1 performs the second operation (horizontal transferring operation) in the first period HT11, and the holding block (second holding block) HB2 performs the second operation in the second period HT12. That is, in each of the plurality of holding blocks HB1 and HB2, the first operation is performed, and subsequently, the second operation and the third operation are performed in parallel. Also, the second operation and the first operation are performed in parallel between different holding blocks in the plurality of holding blocks HB1 and HB2. Driving thereby becomes possible without a period in which there is no signal output (blanking period) with regard to the second row onwards, and a horizontal blanking period for one row can be provided with respect to horizontal transferring operations of the signals of the pixels of all the rows of the pixel array.

As a result, the length of the horizontal blanking period in the total readout period from the pixel array to the output amplifier can be reduced. Specifically, a readout period shortening effect of (m−1)(rows)×t(s) per frame period is obtained, where t(s) is the length of a horizontal blanking period for one row, and m is the number of rows in the pixel array from which signals are read out. Accordingly, the readout speed improves, and the number of shots per unit of time improves.

Figure 5:
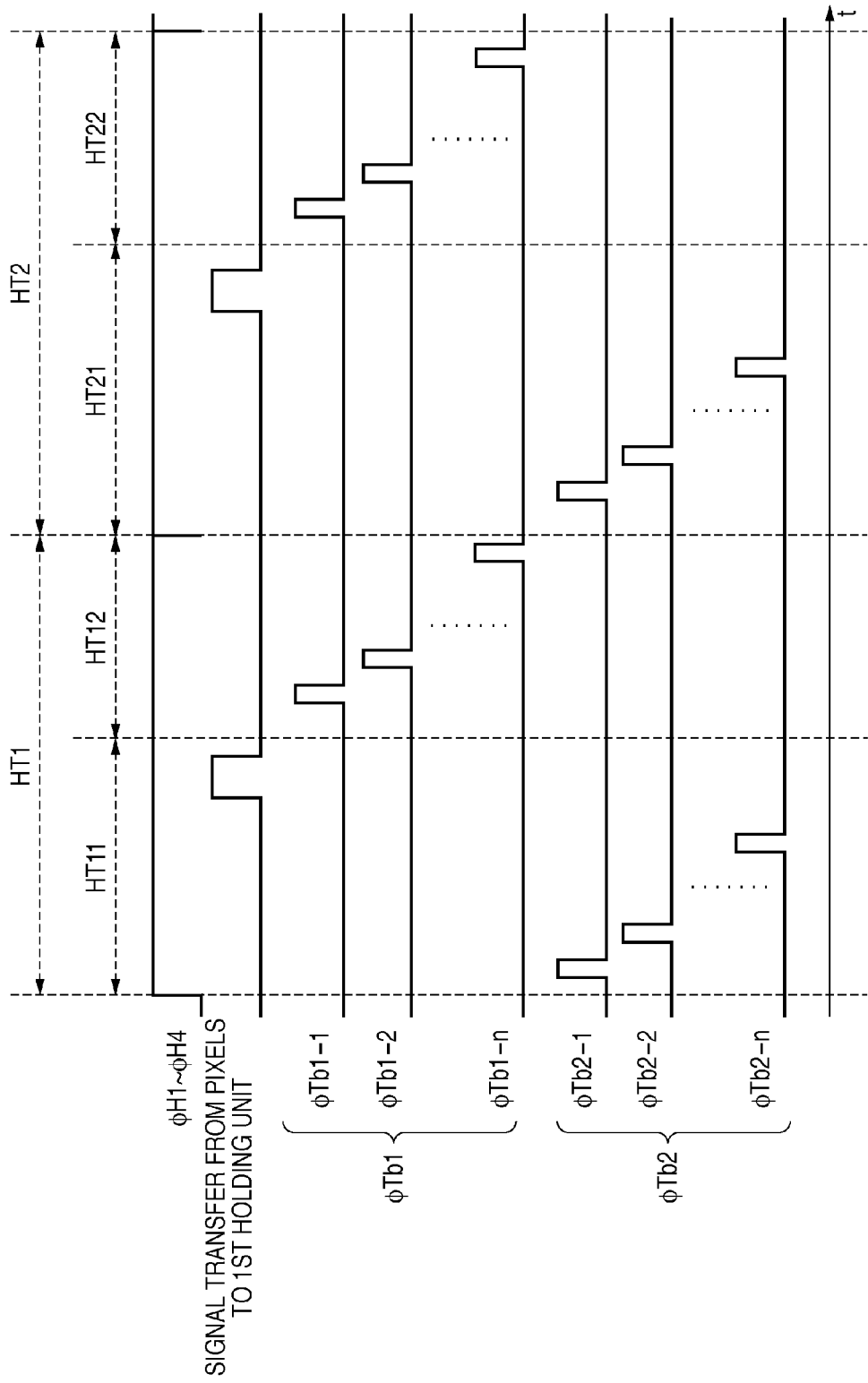
FIG. 5 is a timing chart showing an operation of the image sensing device 100 according to a variation of the first embodiment of the present invention.

Note that while, in the present embodiment, driving is performed by dividing the transfer from the first holding unit to the second holding unit in two in a horizontal direction, the number of divisions (number of holding blocks) can be increased to 2n (n>2), as shown in FIG. 5. That is, in the readout unit, an operation in which signals held in the first holding units are transferred (φTb1-1 to φTb1-$n$, φTb2-1 to φTb2-$n$) to the second holding units via the transfer switches over 2n number of transfers (n>2) may be performed. Because the fluctuation in the current for driving the transfer switches can be reduced in this case, this contributes to a reduction in power consumption and an improvement in shading. However, in this case, the transfer switches require a plurality of control lines. The division number (2n) is arbitrary, provided the sum of the signal transfer period to the first holding unit and the signal transfer period from the first holding unit to the second holding unit does not exceed the horizontal transferring period. Also, the transfer from the first holding unit to the second holding unit may be performed at any timing during the horizontal transferring period, provided that the transfer from the first holding unit is at least performed with respect to a second holding unit that has finished transferring to the horizontal output line, out of the group of second holding units.

Also, while the first holding unit 10 has a configuration that applies gain at a ratio of the clamp capacitance C0 to the feedback capacitance Cf, the first holding unit 10 may have a variable gain structure including a plurality of capacitances in parallel with the capacitance Cf, and a plurality of switching switches for activating the plurality of capacitances so as to change an activated capacitance value.

Figure 6:
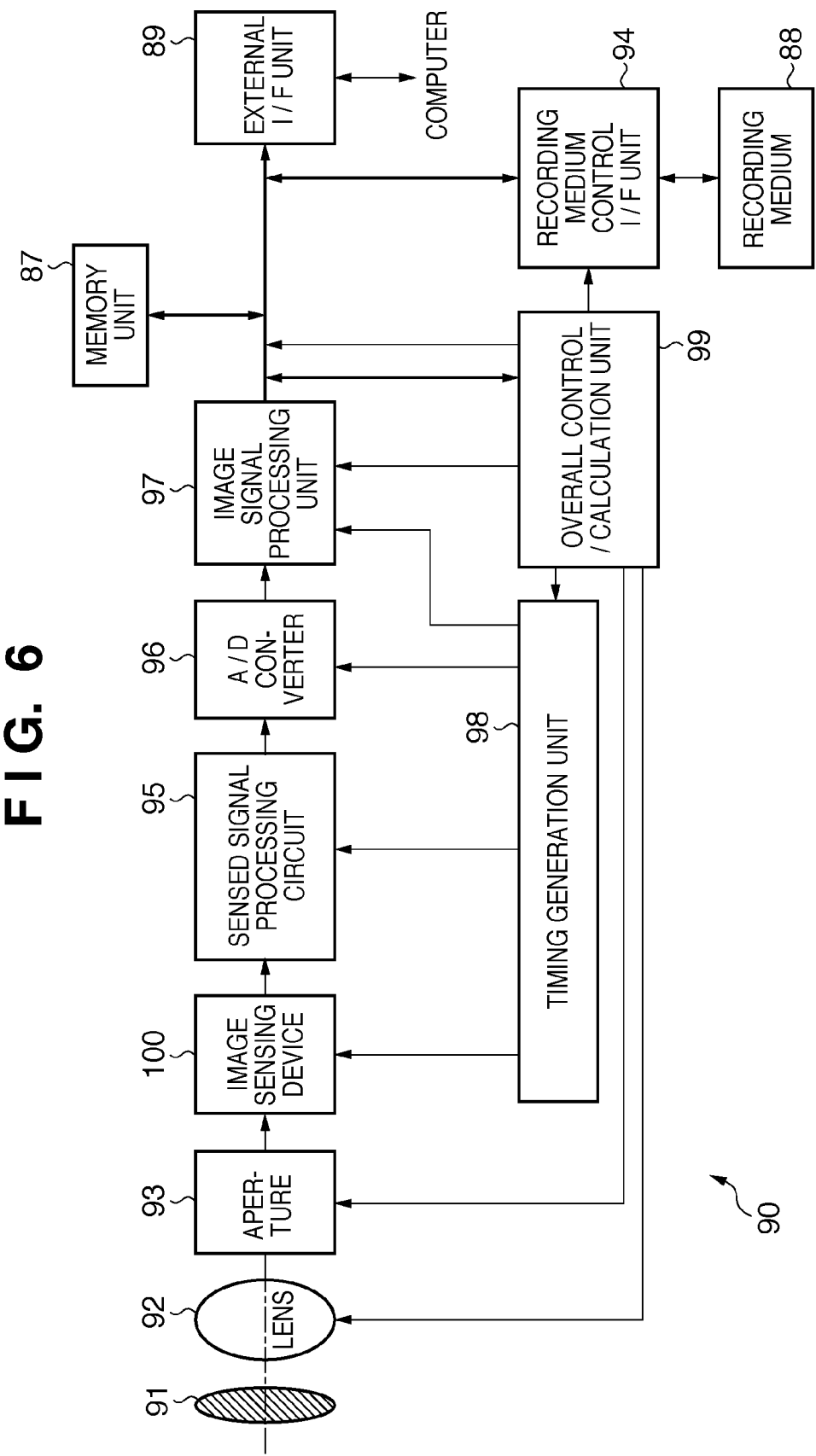
FIG. 6 is a configuration diagram of an image sensing system that applies an image sensing device according to the first embodiment.

An exemplary image sensing system that applies the image sensing device of the present invention is shown in FIG. 6.

An image sensing system 90, as shown in FIG. 6, primarily comprises an optical system, the image sensing device 100, and a signal processing unit. The optical system primarily includes a shutter 91, a lens 92, and a stop 93. The signal processing primarily includes a sensed signal processing circuit 95, an A/D converter 96, an image signal processing unit 97, a memory unit 87, an external I/F unit 89, a timing generation unit 98, an overall control/calculation unit 99, a recording medium 88, and a recording medium control I/F unit 94. Note that the signal processing unit does not always include the recording medium 88.

The shutter 91 is provided in front of the lens 92 on the optical path, and controls exposure of the image sensing device 100.

The lens 92 refracts incident light and forms an image of an object on the pixel array (image sensing plane) of the image sensing device 100.

The stop 93 is provided between the lens 92 and the image sensing device 100 on the optical path, and adjusts the amount of light directed to the image sensing device 100 after passing through the lens 92.

The image sensing device 100 converts the image of the object formed on the pixel array to an image signal. The image sensing device 100 reads out the image signal from the pixel array and outputs the image signal.

The sensed signal processing circuit 95 is connected to the image sensing device 100, and processes the image signal output from the image sensing device 100.

The A/D converter 96 is connected to the sensed signal processing circuit 95, and converts the processed image signal (analog signal) output from the sensed signal processing circuit 95 to an image signal (digital signal).

The image signal processing unit 97 is connected to the A/D converter 96, and performs calculation processes such as various types of correction on the image signal (digital signal) output from the A/D converter 96, and generates image data. This image data is supplied to the memory unit 87, the external I/F unit 89, the overall control/calculation unit 99, the recording medium control I/F unit 94, and the like.

The memory unit 87 is connected to the image signal processing unit 97, and stores the image data output from the image signal processing unit 97.

The external I/F unit 89 is connected to the image signal processing unit 97. The image data output from the image signal processing unit 97 is thereby transferred to an external device (personal computer, etc.) via the external I/F unit 89.

The timing generation unit 98 is connected to the image sensing device 100, the sensed signal processing circuit 95, the A/D converter 96, and the image signal processing unit 97. The timing generation unit 98 thereby supplies timing signals to the image sensing device 100, the sensed signal processing circuit 95, the A/D converter 96, and the image signal processing unit 97. The image sensing device 100, the sensed signal processing circuit 95, the A/D converter 96, and the image signal processing unit 97 then operate in synchronous with the timing signals.

The overall control/calculation unit 99 is connected to the timing generation unit 98, the image signal processing unit 97 and the recording medium control I/F unit 94, and performs overall control of the timing generation unit 98, the image signal processing unit 97 and the recording medium control I/F unit 94.

The recording medium 88 is detachably connected to the recording medium control I/F unit 94. The image data output from the image signal processing unit 97 is thereby recorded to the recording medium 88 via the recording medium control I/F unit 94.

As a result of the above configuration, a favorable image (image data) can be obtained if a favorable image signal is obtained in the image sensing device 100.

Figure 7:
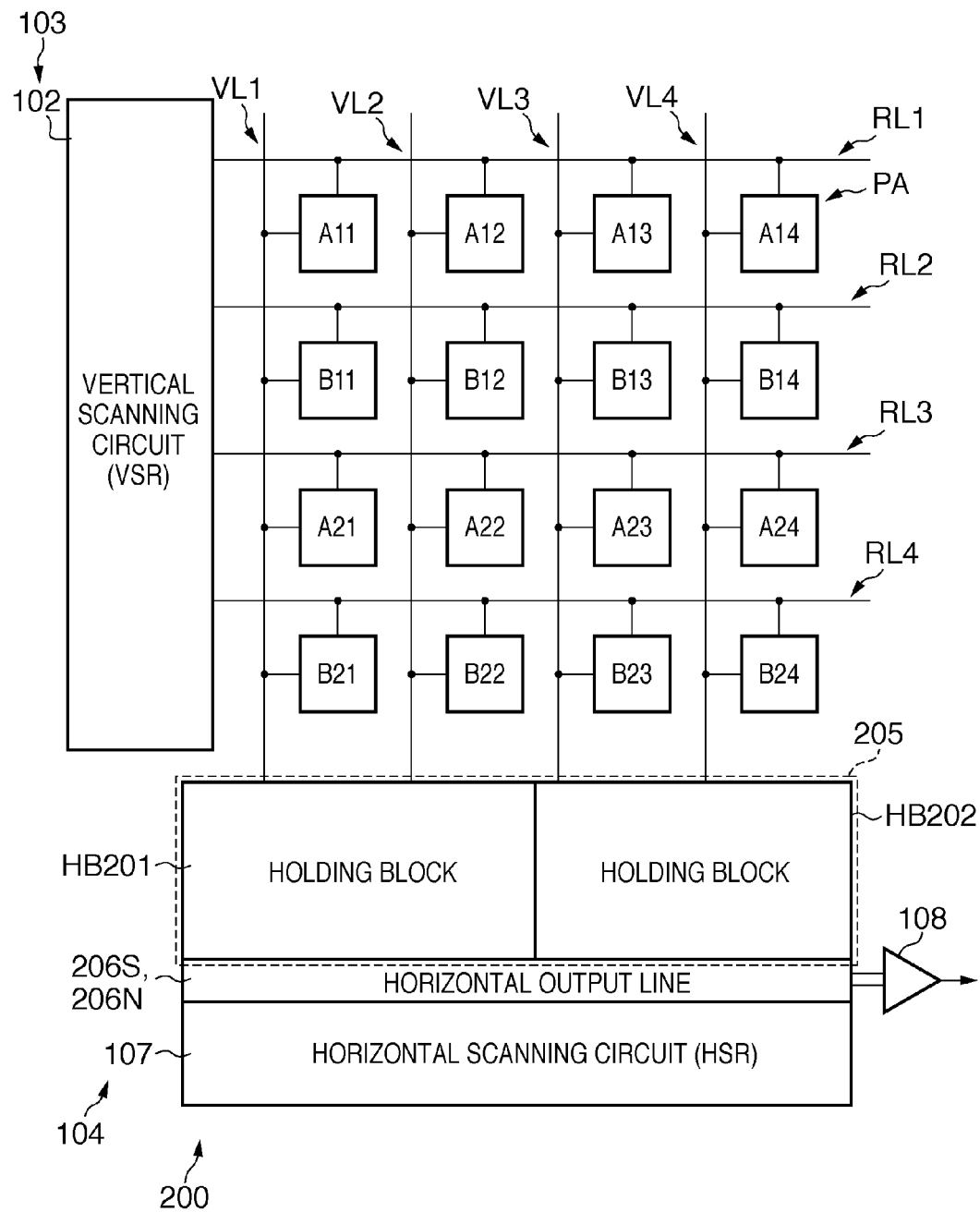
FIG. 7 shows a configuration of an image sensing device 200 according to a second embodiment of the present invention.

An image sensing device 200 according to a second embodiment of the present invention will be described using FIG. 7. FIG. 7 shows a configuration of the image sensing device 200 according to the second embodiment of the present invention. Hereinafter, the points that differ from the first embodiment will be mainly discussed.

The image sensing device 200 is provided with a readout unit 205. The readout unit 205 includes a plurality of holding blocks HB201 and HB202. The plurality of holding blocks HB201 and HB202 and the output amplifier 108 are connected by a horizontal output line 206S for optical signals and a horizontal output line 206N for noise signals.

Figure 8:
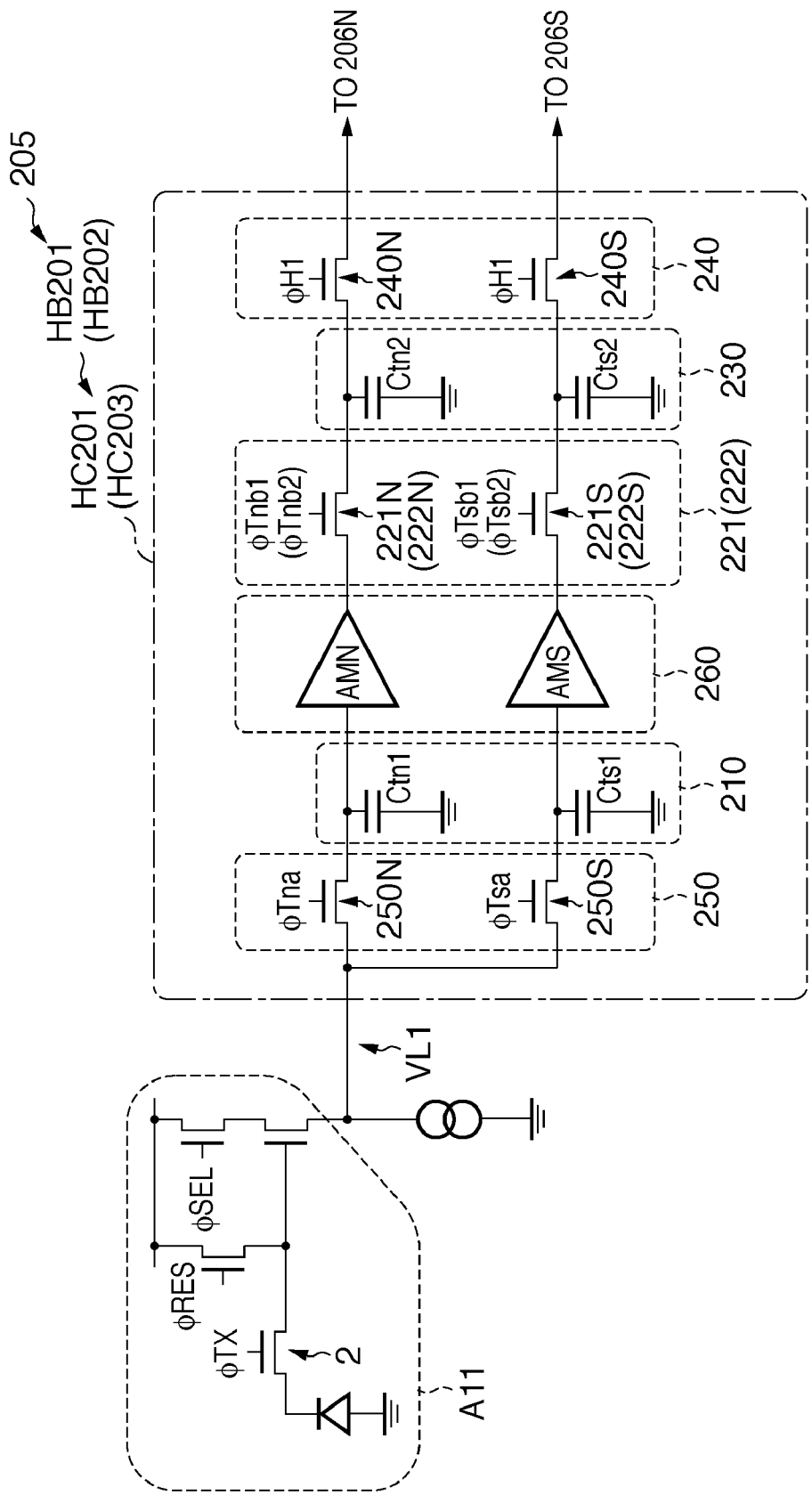
FIG. 8 is an equivalent circuit diagram that simplifies a configuration for one row from a pixel to a horizontal output line in the image sensing device 200 according to the second embodiment of the present invention.

Column signal holding circuits HC201 to HC204 in the holding blocks HB201 and HB202 differ from the first embodiment in configuration, as shown in FIG. 8. FIG. 8 is an equivalent circuit diagram that simplifies the configuration for one row from a pixel to a horizontal output line in the image sensing device 200 according to the second embodiment.

The column signal holding circuit HC201 in the holding block HB201 includes a switch group 250, a first holding unit 210, an amplifier group 260, a transfer switch group 221, a second holding unit 230, and a switch group 240.

The switch group 250 includes a switch 250N and a switch 250S. The first holding unit 210 includes a first noise signal holding unit Ctn1 and a first optical signal holding unit Cts1. The amplifier group 260 includes a buffer amplifier AMN for noise signals and a buffer amplifier AMS for optical signals. The transfer switch group 221 includes a noise signal transfer switch 221N and an optical signal transfer switch 221S. The second holding unit 230 includes a second noise signal holding unit Ctn2 and a second optical signal holding unit Cts2. The switch group 240 includes a switch 240N and a switch 240S.

Figure 9:
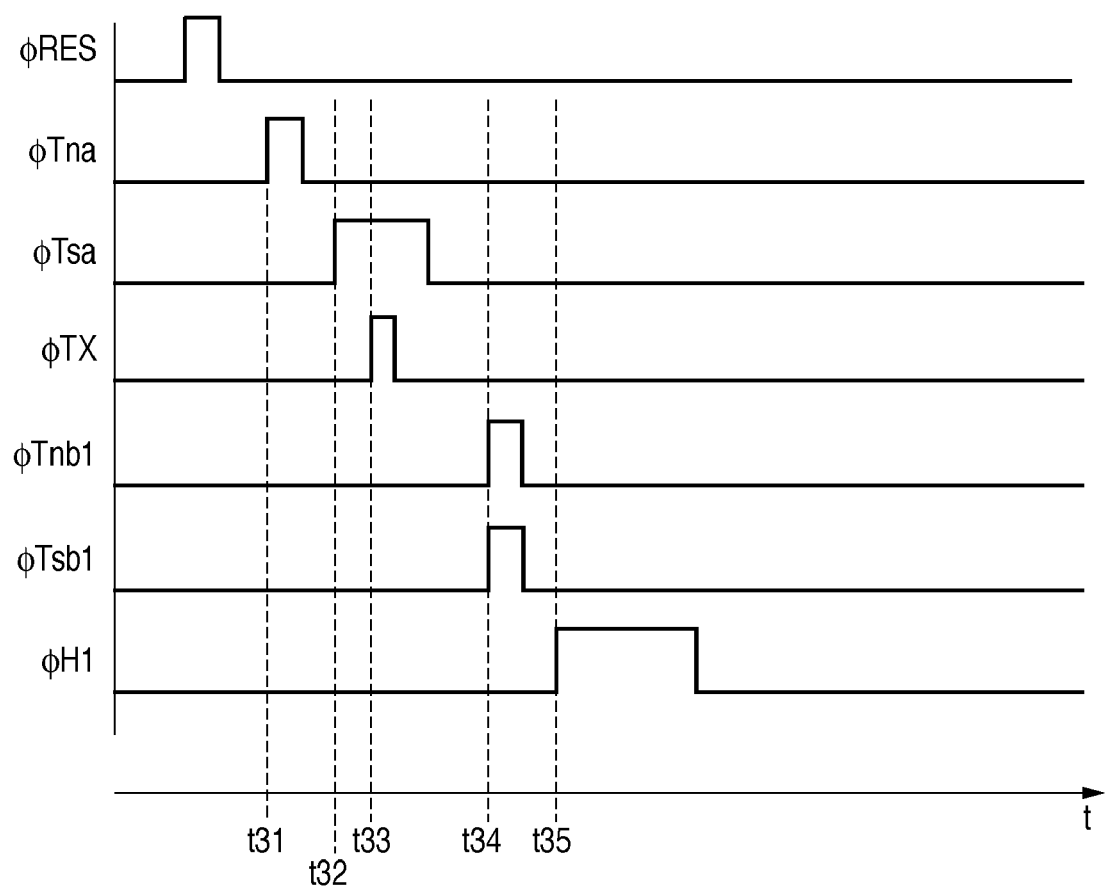
FIG. 9 is a timing chart showing an operation of a column signal holding circuit in the holding blocks.

FIG. 9 is a timing chart showing an operation of a column signal holding circuit in the holding blocks. Here, the operation of the column signal holding circuit HC201 in the holding block HB201 will be illustratively described.

At time t31, the vertical scanning circuit 102 supplies an active level control signal $\phi$Tna to the switch 250N. The switch 250N, by being turned on, transfers the noise signal output from the pixel A11 via the vertical output line VL1 to the first noise signal holding unit Ctn1. The first noise signal holding unit Ctn1 thereby holds the noise signal output from the pixel A11.

At time t32, the vertical scanning circuit 102 supplies an active level control signal $\phi$Tsa to the switch 250S. The switch 250S is turned on.

At time t33, the vertical scanning circuit 102 supplies an active level transfer control signal $\phi$TX to the transfer unit 2 of the pixel A11. The optical signal output from the pixel A11 to the vertical output line VL1 is thereby transferred to the first optical signal holding unit Cts1. The first optical signal holding unit Cts1 thereby holds the optical signal output from the pixel A11.

At time t34, the vertical scanning circuit 102 supplies an active level control signal $\phi$Tnb1 to the noise signal transfer switch 221N. The buffer amplifier AMN for noise signals thereby amplifies the noise signal held in the first noise signal holding unit Ctn1, and transfers the amplified noise signal to the noise signal transfer switch 221N. The noise signal transfer switch 221N, by being turned on, transfers the transferred noise signal to the second noise signal holding unit Ctn2. The second noise signal holding unit Ctn2 holds the noise signal transferred from the first noise signal holding unit Ctn1.

Meanwhile, the vertical scanning circuit 102 also supplies an active level control signal $\phi$Tsb1 to the optical signal transfer switch 221S. The buffer amplifier AMS for optical signals thereby amplifies the optical signal held in the first optical signal holding unit Cts1, and transfers the amplified optical signal to the optical signal transfer switch 221S. The optical signal transfer switch 221S, by being turned on, transfers the transferred optical signal to the second optical signal holding unit Cts2. The second optical signal holding unit Cts2 holds the optical signal transferred from the first optical signal holding unit Cts1.

At time t35, the horizontal scanning circuit 107 supplies an active level horizontal transferring signal $\phi$H1 to the switch 240N and the switch 240S. The switch 240N, by being turned on, transfers the noise signal held in the second noise signal holding unit Ctn2 to the output amplifier 108 via the horizontal output line 206N. The switch 240S, by being turned on, transfers the optical signal held in the second optical signal holding unit Cts2 to the output amplifier 108 via the horizontal output line 206S. The output amplifier 108 generates an image signal by getting the difference of the noise signal transferred from the second noise signal holding unit Ctn2 and the optical signal transferred from the second optical signal holding unit Cts2, and outputs the generated image signal.

Figure 10:
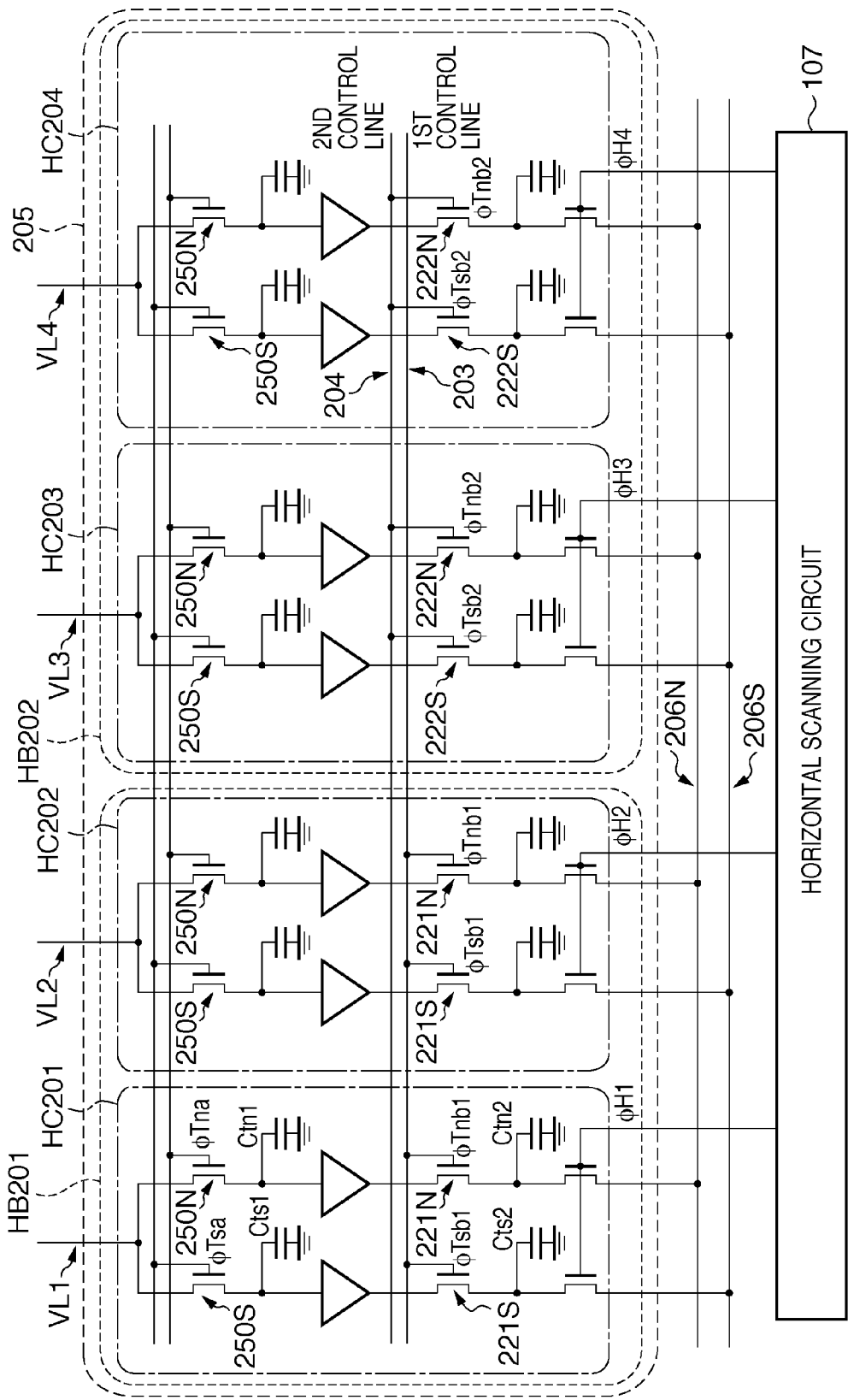
FIG. 10 shows a layout configuration of a plurality of holding blocks HB201 and HB202.

Also, the layout configuration of the plurality of holding blocks HB201 and HB202 differs from the first embodiment in the following points as shown in FIG. 10. FIG. 10 shows an arrangement of circuit elements that corresponds to the layout configuration of the plurality of holding blocks HB201 and HB202.

The noise signal transfer switch 221N and the optical signal transfer switch 221S in the holding block HB201, and a noise signal transfer switch 222N and an optical signal transfer switch 222S in the holding block HB202 differ in the control lines connected to the gates. The gates of the noise signal transfer switch 221N and the optical signal transfer switch 221S are connected to the first control line 203, and respectively receive control signals φTnb1 and φTsb1 from the vertical scanning circuit 102 via the first control line 203. The gates of the noise signal transfer switch 222N and the optical signal transfer switch 222S are connected to the second control line 204, and respectively receive control signals φTnb2 and φTsb2 from the vertical scanning circuit 102 via the second control line 204.

Figure 11:
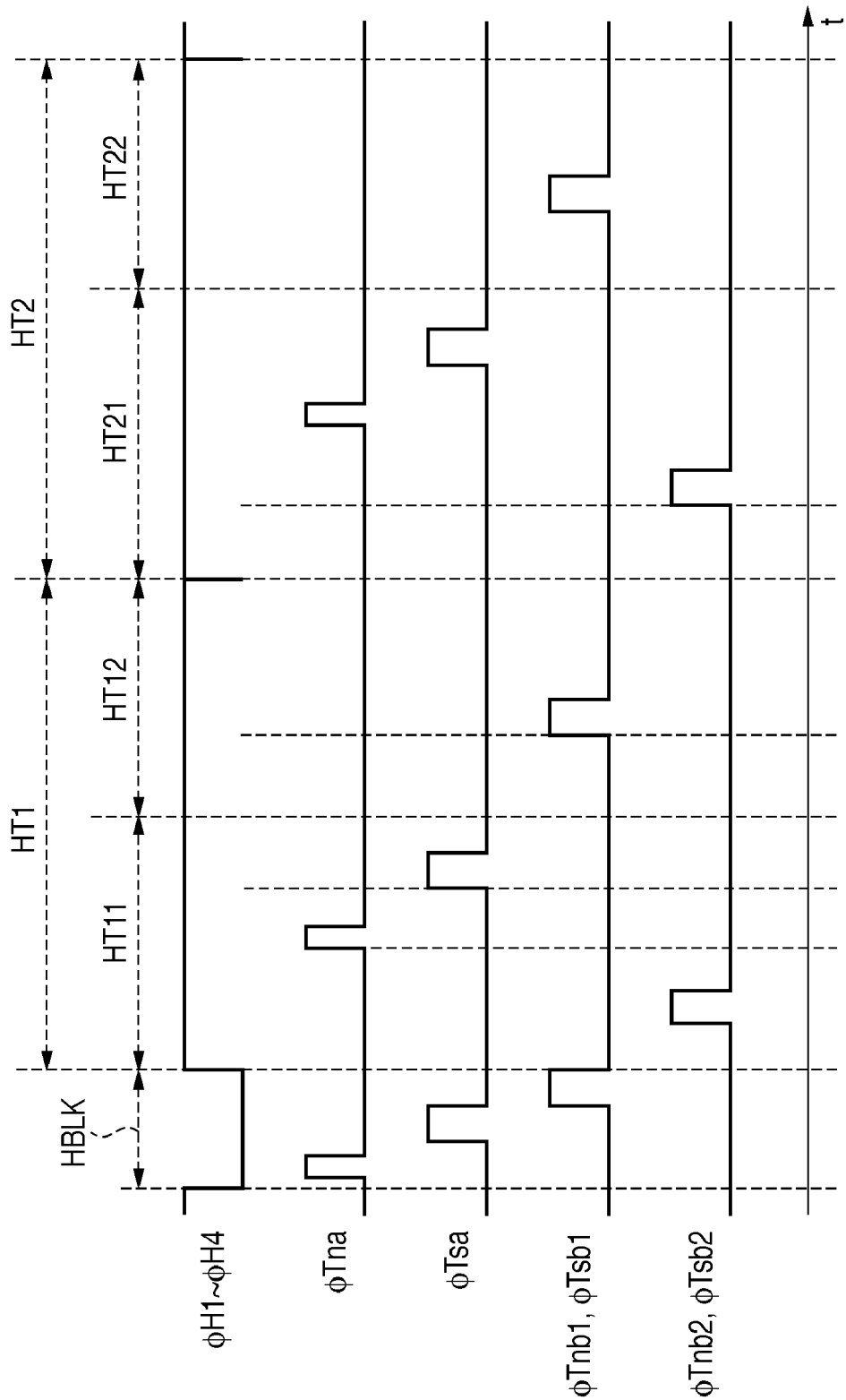
FIG. 11 is a timing chart showing an operation of the image sensing device 200 according to the second embodiment of the present invention.

FIG. 11 is a timing chart showing the operation of the image sensing device 200 according to the second embodiment of the present invention. The points that differ from the timing according to the first embodiment will be mainly discussed.

In the horizontal blanking period HBLK, the following operation is performed in the period during which the control signal φTna is at an active level. The noise signals output from the pixels A11 to A14 of the first row are transferred to the first noise signal holding units Ctn1 in the column signal holding circuits of the holding blocks, and held. Then, in the period during which the control signal φTsa is at an active level, the optical signals output from the pixels A11 to A14 of the first row are transferred to the first optical signal holding units Cts1 in the column signal holding circuits of the holding blocks, and held.

In the horizontal transferring period HT1 for the signals of the pixels of the first row, the following operation is performed. In the period during which the control signal φTna is at an active level, the noise signals output from the pixels B11 to B14 of the second row are transferred to the first noise signal holding units Ctn1 in the column signal holding circuits of the holding blocks, and held. Then, in the period during which the control signal φTsa is at an active level, the optical signals output from the pixels B11 to B14 of the second row are transferred to the first optical signal holding units Cts1 in the column signal holding circuits of the holding blocks, and held.

Note that in terms of the connection between the first holding unit 210 and the second holding unit 230 (see FIG. 8), the circuit form is not limited to that shown in FIG. 8. A configuration that applies gain or a circuit form such as a voltage follower or a source follower is possible.

An image sensing device 300 according to a third embodiment of the present invention will be described. Hereinafter, the points that differ from the second embodiment will be mainly discussed.

Figure 12:
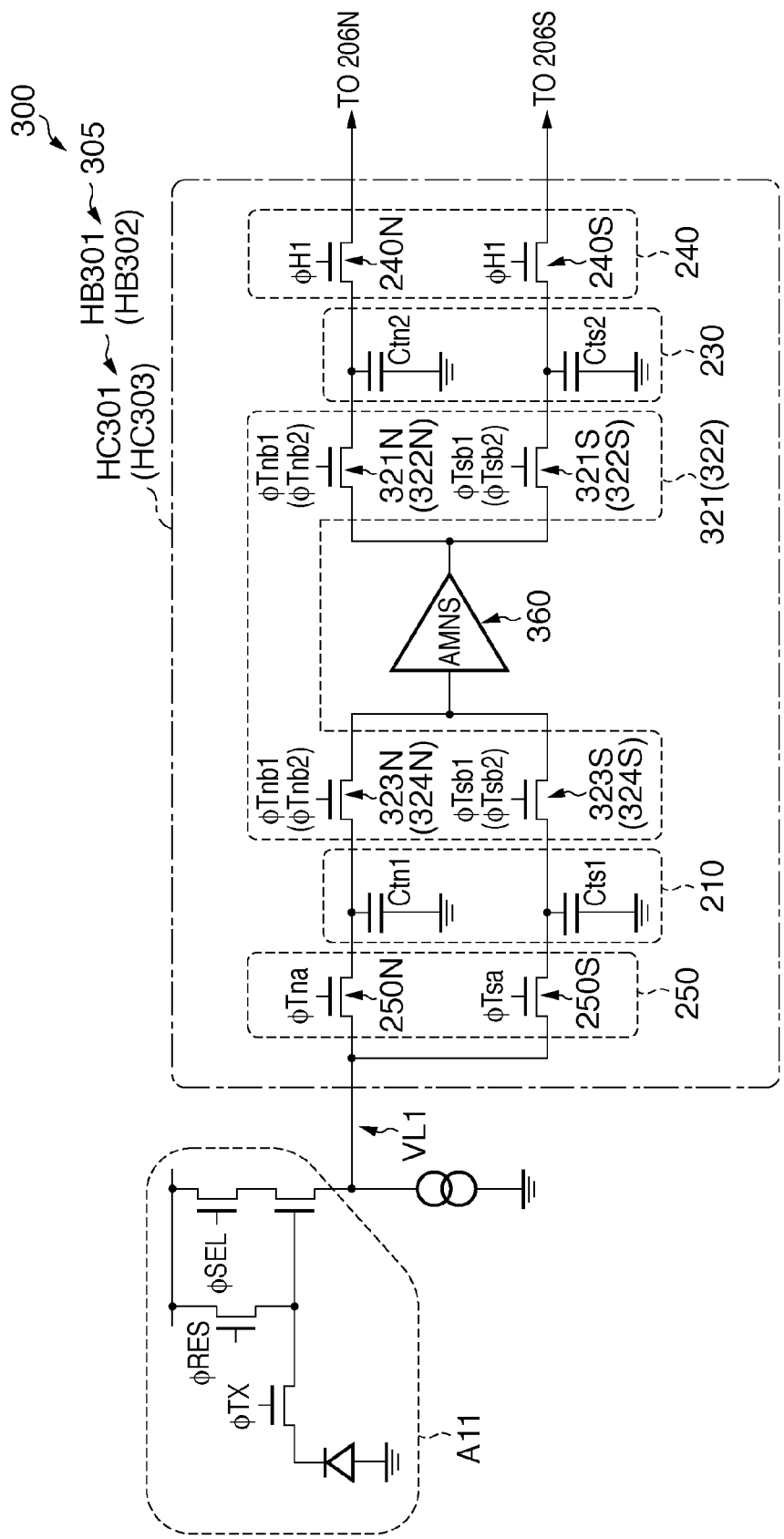
FIG. 12 is an equivalent circuit diagram that simplifies a configuration for one row from a pixel to a horizontal output line in an image sensing device 300 according to a third embodiment of the present invention.

The image sensing device 300 includes a readout unit 305. The readout unit 305 includes a plurality of holding blocks HB301 and HB302. Column signal holding circuits HC301 to HC304 in the holding blocks HB301 and HB302 differ from the second embodiment in configuration, as shown in FIG. 12. FIG. 12 is an equivalent circuit diagram that simplifies the configuration for one row from a pixel to a horizontal output line in the image sensing device 300 according to the third embodiment.

The column signal holding circuit HC301 in the holding block HB301 includes an amplifier 360 and a transfer switch group 321.

The amplifier 360 includes a buffer amplifier AMNS commonly used for the noise signals and the optical signals. The transfer switch group 321 includes noise signal transfer switches 321N and 323N and optical signal transfer switches 321S and 323S.

Figure 13:
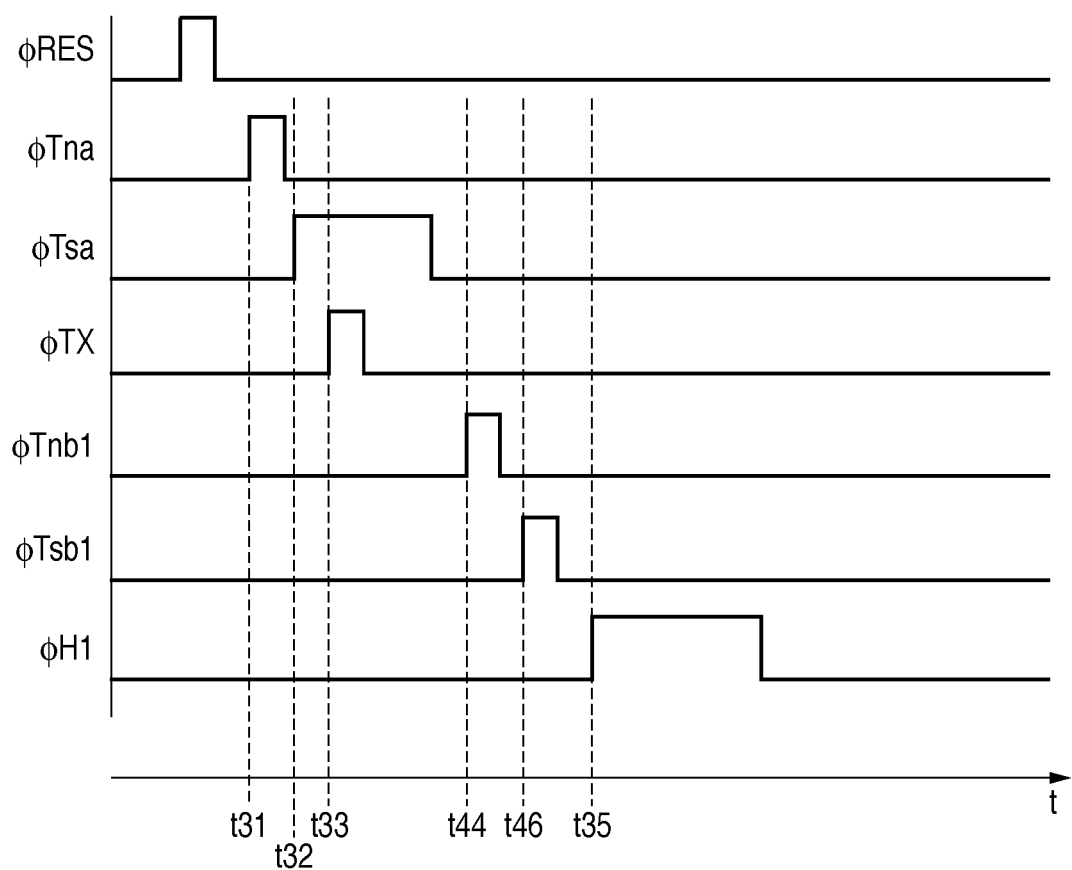
FIG. 13 is a timing chart showing an operation of a column signal holding circuit in the holding blocks.

FIG. 13 is a timing chart showing the operation of the column signal holding circuits in the holding blocks. Here, the operation of the column signal holding circuit HC301 in the holding block HB301 will be illustratively described. The points that differ from the timing according to the second embodiment will be mainly discussed.

At time t44, the vertical scanning circuit 102 supplies an active level control signal φTnb1 to the noise signal transfer switches 323N and 321N. The noise signal transfer switch 323N, by being turned on, thereby transfers the noise signal held in the first noise signal holding unit Ctn1 to the buffer amplifier AMNS. The buffer amplifier AMNS amplifies the transferred noise signal, and transfers the amplified noise signal to the noise signal transfer switch 321N. The noise signal transfer switch 321N, by being turned on, transfers the transferred noise signal to the second noise signal holding unit Ctn2. The second noise signal holding unit Ctn2 holds the noise signal transferred from the first noise signal holding unit Ctn1.

At time t46, the vertical scanning circuit 102 supplies an active level control signal φTsb1 to the optical signal transfer switches 323S and 321S. The optical signal transfer switch 323S, by being turned on, thereby transfers the optical signal held in the first optical signal holding unit Cts1 to the buffer amplifier AMNS. The buffer amplifier AMNS amplifies the transferred optical signal, and transfers the amplified optical signal to the optical signal transfer switch 321S. The optical signal transfer switch 321S, by being turned on, transfers the transferred optical signal to the second optical signal holding unit Cts2. The second optical signal holding unit Cts2 holds the optical signal transferred from the first optical signal holding unit Cts1.

Figure 14:
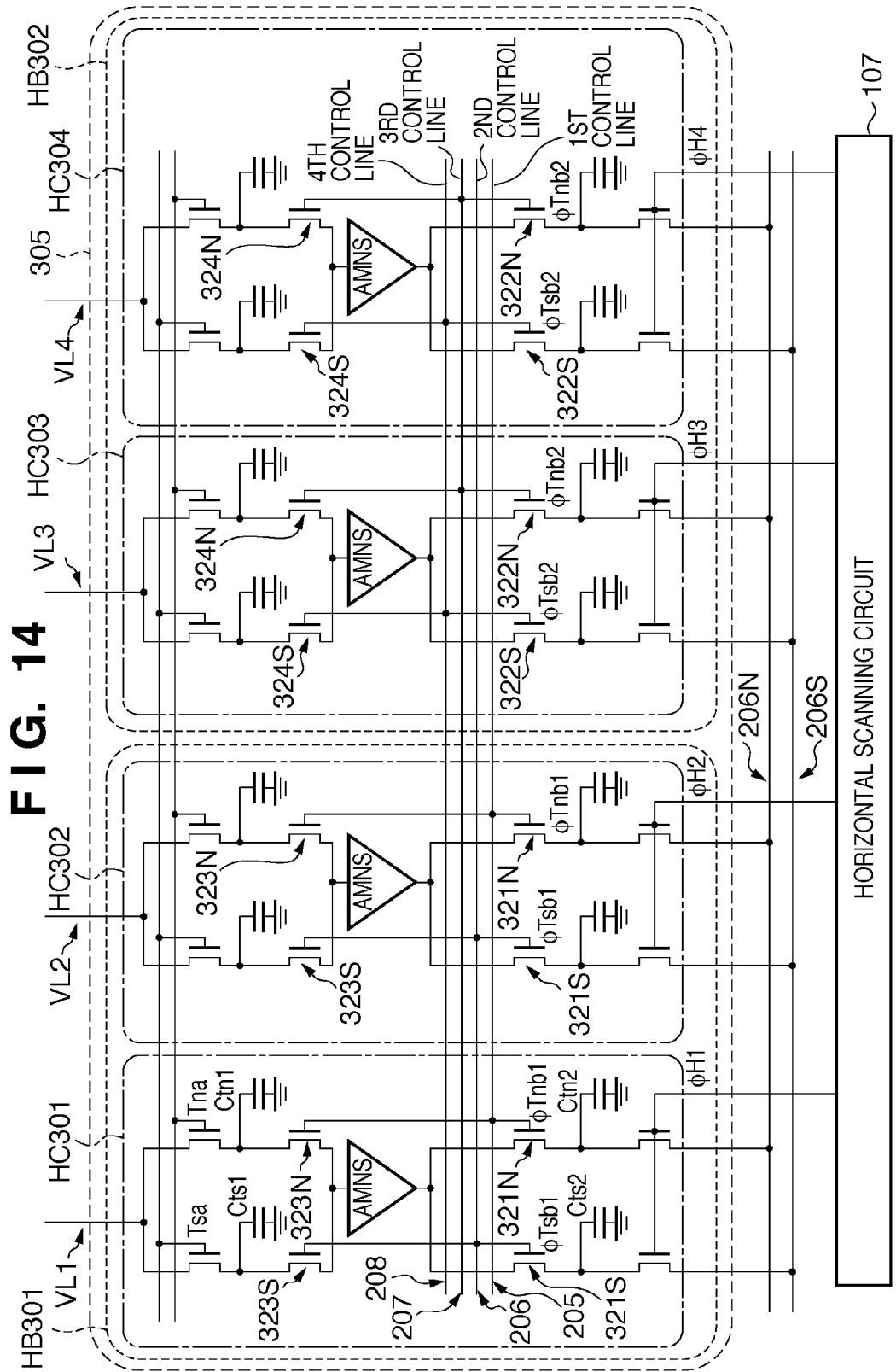
FIG. 14 shows a layout configuration of a plurality of holding blocks HB301 and HB302.

Also, the layout configuration of the plurality of holding blocks HB301 and HB302 differs from the second embodiment in the following points, as shown in FIG. 14. FIG. 14 shows a circuit arrangement that corresponds to the layout configuration of the plurality of holding blocks HB301 and HB302.

The noise signal transfer switches 321N and 323N and the optical signal transfer switches 321S and 323S in the holding block HB301 differ in the control lines connected to the gates. The gates of the noise signal transfer switches 321N and 323N are connected to a first control line 205, and receive the control signal φTnb1 from the vertical scanning circuit 102 via the first control line 205. The gates of the optical signal transfer switches 321S and 323S are connected to a second control line 206, and receive the control signal φTsb1 from the vertical scanning circuit 102 via the second control line 206.

Similarly, noise signal transfer switches 322N and 324N and optical signal transfer switches 322S and 324S in the holding block HB302 differ in the control lines connected to the gates. The gates of the noise signal transfer switches 322N and 324N are connected to a third control line 207, and receive the control signal φTnb2 from the vertical scanning circuit 102 via the third control line 207. The gates of the optical signal transfer switches 322S and 324S are connected to a fourth control line 208, and receive the control signal φTsb2 from the vertical scanning circuit 102 via the fourth control line 208.

Such a configuration differs from the second embodiment in that the noise signal transfer switches and the optical signal transfer switches in the holding blocks are each driven separately.

Figure 15:
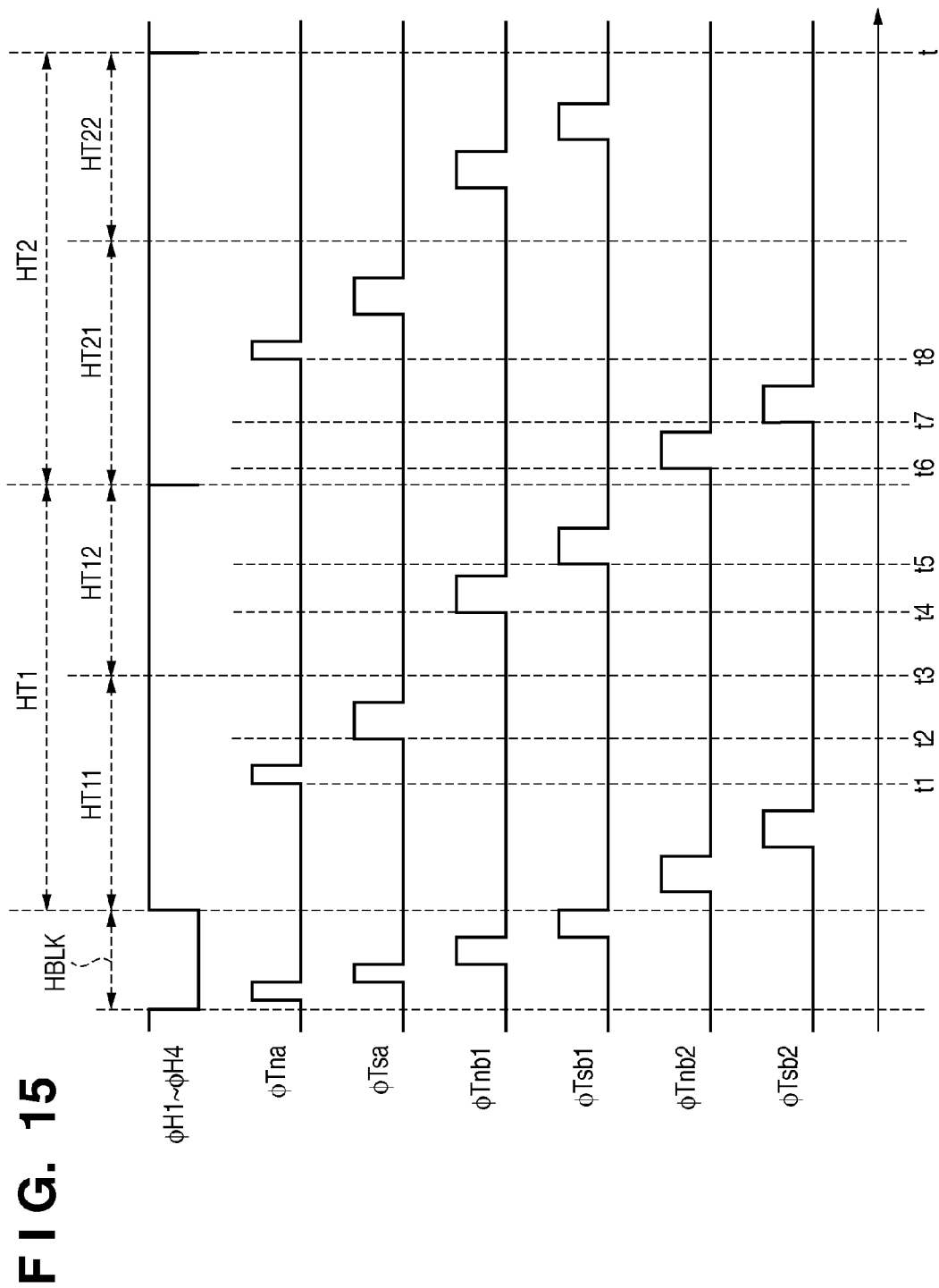
FIG. 15 is a timing chart showing an operation of the image sensing device 300 according to the third embodiment of the present invention.

Also, the operation of the image sensing device 300 according to the third embodiment of the present invention differs from the second embodiment in the following points, as shown in FIG. 15. FIG. 15 is a timing chart showing the operation of the image sensing device 300 according to the third embodiment of the present invention.

In the horizontal blanking period HBLK, the following operation is performed in the period during which the control signal φTnb1 is at an active level. The noise signals held in the first noise signal holding units Ctn1 of the holding block HB301 are transferred to the second noise signal holding units Ctn2 via the buffer amplifiers AMNS, and held. Then, in the period during which the control signal φTsb1 is at an active level, the optical signals held in the first optical signal holding units Cts1 of the holding block HB301 are transferred to the second optical signal holding units Cts2 via the buffer amplifiers AMNS, and held.

In the first period HT11, in the period during which the control signal φTnb2 is at an active level, the noise signals held in the first noise signal holding units Ctn1 of the holding block HB302 are transferred to the second noise signal holding units Ctn2 via the buffer amplifiers AMNS, and held. Then, in the period during which the control signal φTsb2 is at an active level, the optical signals held in the first optical signal holding unit Cts1 of the holding block HB302 are transferred to the second optical signal holding unit Cts2 via the buffer amplifier AMNS, and held.

With the configuration of the second embodiment (see FIG. 8), the output amplifier 108 generates an image signal by getting the difference of a noise signal that contains the offset of the buffer amplifier AMN and an optical signal that contains the offset of the buffer amplifier AMS, and outputs the generated image signal. The difference of the offset of the buffer amplifier AMN and the offset of the buffer amplifier AMS may thereby possibly remain in the image signal output from the output amplifier 108.

In contrast, with the configuration of the present embodiment (see FIG. 12), the output amplifier 108 generates an image signal by getting the difference of a noise signal that contains the offset of the buffer amplifier AMNS and an optical signal that includes an offset of the buffer amplifier AMNS, and outputs the generated image signal. A signal from which the offset of the buffer amplifier AMNS has been removed can thereby be generated and output.

An image sensing device 400 according to a fourth embodiment of the present invention will be described. Hereinafter, the points that differ from the third embodiment will be mainly discussed.

Figure 16:
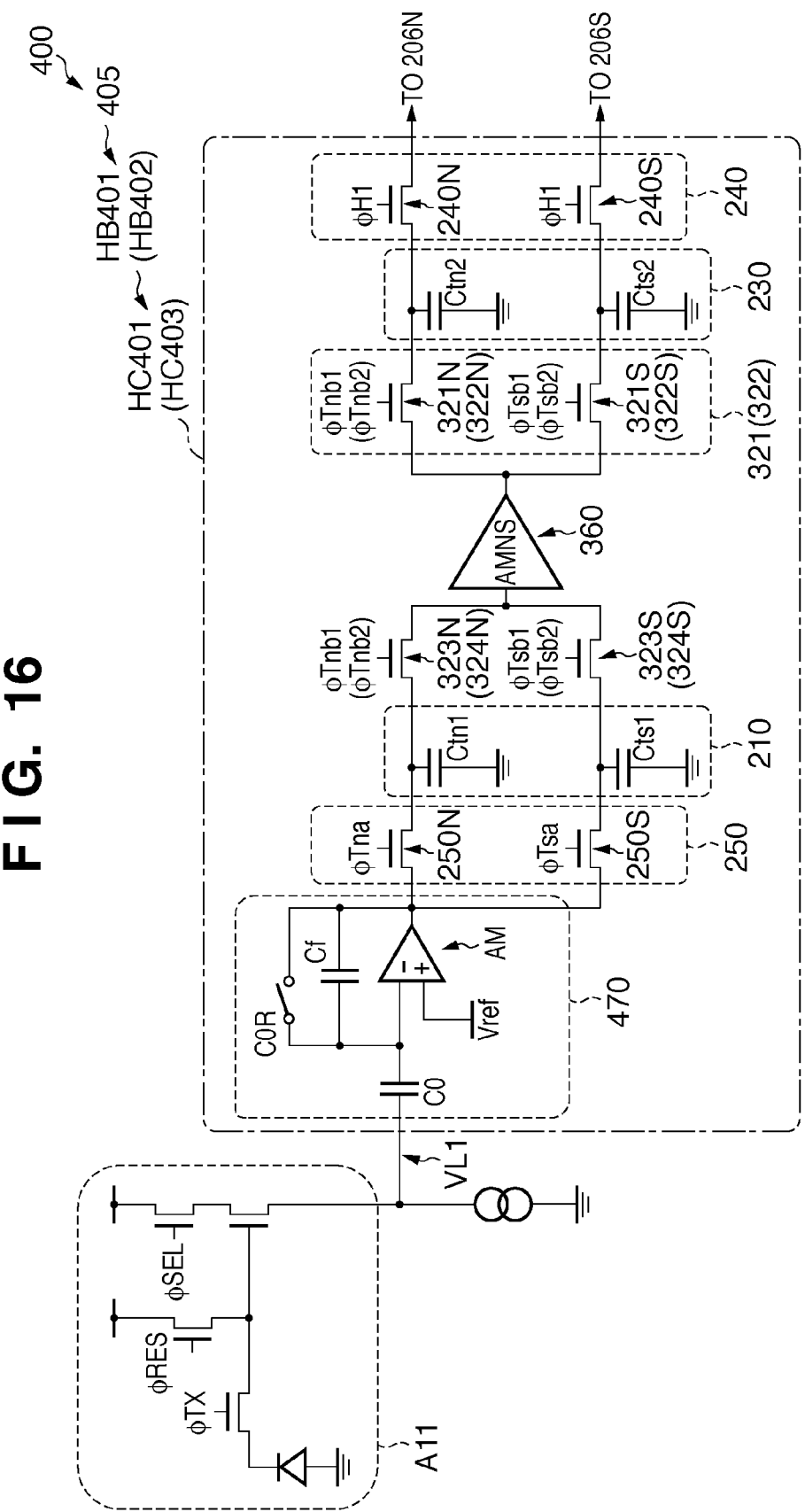
FIG. 16 is an equivalent circuit diagram that simplifies a configuration for one row from a pixel to a horizontal output line in an image sensing device 400 according to a fourth embodiment of the present invention.

The image sensing device 400 includes a plurality of holding blocks HB401 and HB402. Column signal holding circuits HC401 to HC404 in the holding blocks HB401 and HB402 differ from the third embodiment in configuration, as shown in FIG. 16. FIG. 16 is an equivalent circuit diagram that simplifies the configuration for one row from a pixel to a horizontal output line in the image sensing device 400 according to the fourth embodiment.

The column signal holding circuit HC401 in the holding block HB401 includes a signal amplification unit 470.

The signal amplification unit 470 includes a column amplifier AM, a clamp capacitance C0, a feedback capacitance Cf, and a switch C0R.

A terminal for supplying a reference potential Vref is connected to the non-inverting input terminal of the column amplifier AM. The vertical output line VL1 is connected to the inverting input terminal of the column amplifier AM via the clamp capacitance C0. Also, the feedback capacitance Cf and the switch C0R are connected in parallel to the output terminal and the inverting input terminal of the column amplifier AM.

According to the present configuration, amplification of a signal is possible, using the signal amplification unit 470 provided between the vertical output line VL1 and the first holding unit 210. That is, a signal of the above expression (1) appears in the output terminal of the column amplifier AM. A signal of the above expression (2) thereby appears as an image signal in the feedback capacitance Cf. As represented by expression (2), a signal obtained by applying the gain of C0/(Cf) to the optical signal and further adding the offset of the column amplifier AM is output from the signal amplification unit 470 to the first holding unit 210.

Note that while, in the present embodiment, the signal amplification unit 470 is configured to apply gain at a ratio of the capacitance C0 to the capacitance Cf, the signal amplification unit 470 may have a variable gain structure including a plurality of capacitances in parallel with the capacitance Cf, and a plurality of switching switches for activating the plurality of capacitances so as to change an activated capacitance value.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-235590, filed Sep. 12, 2008, which is hereby incorporated by reference herein in its entirety.

What is claimed is:

1. An image sensing device comprising:
a pixel array in which a plurality of pixels are arrayed in a direction along a row and in a direction along a column;
a row selection unit that selects a row in the pixel array;
a readout unit that reads out and temporarily holds a signal from the row selected by the row selection unit;
an output amplifier; and
a horizontal scanning unit that scans the readout unit in a direction along a row,
wherein the readout unit includes a plurality of holding blocks,
each of the plurality of holding blocks includes at least one column signal holding circuit that temporarily holds a signal of one column of the row selected by the row selection unit,
the column signal holding circuit includes:
a first holding unit that holds a signal output from a pixel;
a second holding unit; and
a transfer switch that transfers the signal held in the first holding unit to the second holding unit,
the horizontal scanning unit scans the plurality of column signal holding circuits in the readout unit in a direction along a row, such that the signals of the columns held in the second holding units of the column signal holding circuits are sequentially transferred to the output amplifier, in each of the plurality of holding blocks, a first operation in which the signal held in the first holding unit of the column signal holding circuit is transferred to the second holding unit via the transfer switch is performed, and subsequently, a second operation and a third operation are performed in parallel, wherein, in the second operation, the signal transferred to and held in the second holding unit of the column signal holding circuit is transferred to the output amplifier in response to scanning by the horizontal scanning unit, and, in the third operation, a signal output from a pixel in a row that is selected next by the row selection unit is read out to the first holding unit of the column signal holding circuit, the second operation and the first operation are performed in parallel between different holding blocks in the plurality of holding blocks.

2. The image sensing device according to claim 1, wherein the transfer switches are turned on at different timings between different holding blocks in the plurality of holding blocks, and whereby the first operation in the different holding blocks is performed at different timings.

3. The image sensing device according to claim 1, wherein the plurality of holding blocks includes:
a first holding block in which the second operation is performed in a first period; and
a second holding block in which the second operation is performed in a second period that follows the first period,
and wherein the first holding block performs the first operation prior to the first period, and
the second holding block performs the first operation in the first period.

4. The image sensing device according to claim 1, wherein
the pixel of each column in the row selected by the row selection unit outputs a noise signal and an optical signal at different timings,
the first holding unit includes:
a first noise signal holding unit that holds a noise signal output from the pixel; and
a first optical signal holding unit that holds an optical signal output from the pixel,
the second holding unit includes:
a second noise signal holding unit that holds a noise signal transferred from the first noise signal holding unit; and
a second optical signal holding unit that holds an optical signal transferred from the first optical signal holding unit,
the transfer switch includes:
a noise signal transfer switch that transfers the noise signal held in the first noise signal holding unit to the second noise signal holding unit; and
an optical signal transfer switch that transfers the optical signal held in the first optical signal holding unit to the second optical signal holding unit, and
the output amplifier generates an image signal by taking a difference of a noise signal transferred from the second noise signal holding unit and an optical signal transferred from the second optical signal holding unit, and outputs the generated image signal.

5. The image sensing device according to claim 1, wherein each of the plurality of holding blocks further includes an amplifier that amplifies the signal held in the first holding unit and transfers the amplified signal to the transfer switch.

6. An image sensing system comprising:
an image sensing device as claimed in claim 1;
an optical system that forms an image on an image sensing plane of the image sensing device; and
a signal processing unit that processes a signal output from the image sensing device and generates image data.

* * * * *